(12) United States Patent
Tener et al.

(10) Patent No.: US 7,978,880 B2
(45) Date of Patent: Jul. 12, 2011

(54) CONTINUOUS EXTENDED RANGE IMAGE PROCESSING

(75) Inventors: Gene D. Tener, Oviedo, FL (US); Barry Mattox, Orlando, FL (US); Jennifer K. Park, Winter Springs, FL (US); John Cowan, Orlando, FL (US); William R. Herzog, Orlando, FL (US); Hai-Wen Chen, Orlando, FL (US); James P. Kane, III, Altamonte Springs, FL (US); David J. Huber, Orlando, FL (US); Timothy Alderson, Winter Springs, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/817,417

(22) Filed: Jun. 17, 2010

(65) Prior Publication Data

US 2010/0253855 A1 Oct. 7, 2010

Related U.S. Application Data

(62) Division of application No. 11/429,958, filed on May 9, 2006.
(60) Provisional application No. 60/678,775, filed on May 9, 2005.

(51) Int. Cl.
*G06K 9/00* (2006.01)
*G06K 9/32* (2006.01)

(52) U.S. Cl. .................. 382/103; 382/294; 382/299

(58) Field of Classification Search .................. 382/103, 382/294, 299
See application file for complete search history.

(56) References Cited

U.S. PATENT DOCUMENTS

| | | | |
|---|---|---|---|
| 3,218,637 A | 11/1965 | Balding | |
| 4,675,532 A | 6/1987 | Carson | |
| 5,731,851 A | 3/1998 | Jung | |
| 5,881,178 A | 3/1999 | Tsykalov et al. | |
| 5,886,742 A * | 3/1999 | Hibi et al. | ................ 375/240.16 |
| 5,923,786 A | 7/1999 | Murayama | |
| 6,335,990 B1 | 1/2002 | Chen et al. | |
| 6,359,681 B1 | 3/2002 | Housand et al. | |
| 6,657,676 B1 | 12/2003 | Borneo et al. | |
| 6,927,796 B2 | 8/2005 | Liu et al. | |
| 6,999,634 B2 | 2/2006 | Hong | |
| 7,613,321 B2 * | 11/2009 | Altherr et al. | ................ 382/103 |
| 7,660,439 B1 | 2/2010 | Lu et al. | |

(Continued)

OTHER PUBLICATIONS

"A novel zoom invariant video object tracking algorithm (ZIVOTA)", Wei, Yankun et al. (IEEE CCECE 2003, May 4-7, 2003, vol. 2, pp. 1191-1194.*

(Continued)

*Primary Examiner* — Wenpeng Chen
(74) *Attorney, Agent, or Firm* — Buchanan Ingersoll & Rooney PC

(57) ABSTRACT

Methods and systems for image processing are provided. A method for processing images of a scene includes receiving image data of a reference and a current frame; generating N motion vectors that describe motion of the image data within the scene by computing a correlation function on the reference and current frames at each of N registration points; registering the current frame based on the N motion vectors to produce a registered current frame; and updating the image data of the scene based on the registered current frame. Optionally, registered frames may be oversampled. Techniques for generating the N motion vectors according to roll, zoom, shift and optical flow calculations, updating image data of the scene according to switched and intermediate integration approaches, re-introducing smoothed motion into image data of the scene, re-initializing the process, and processing images of a scene and moving target within the scene are provided.

19 Claims, 16 Drawing Sheets

U.S. PATENT DOCUMENTS

| | | | |
|---|---|---|---|
| 2002/0159648 A1 | 10/2002 | Alderson et al. | |
| 2002/0159651 A1* | 10/2002 | Tener et al. | 382/266 |
| 2003/0058360 A1 | 3/2003 | Liu et al. | |
| 2003/0095189 A1 | 5/2003 | Liu et al. | |
| 2004/0130680 A1 | 7/2004 | Zhou et al. | |
| 2004/0136567 A1 | 7/2004 | Billinghurst et al. | |
| 2004/0221237 A1 | 11/2004 | Foote et al. | |
| 2006/0018537 A1 | 1/2006 | Wu et al. | |

OTHER PUBLICATIONS

Tomasi, C and T. Kanade, "Detection and Tracking of Point Features", CMU Tech. Rep. CMU-CS-91-132, Apr. 1991, pp. 1-22.*

Wei, et al., A novel zoom invariant video object tracking algorithm (ZIVOTA), IEEE CCECE 2003, May 4-7, 2003, vol. 2, pp. 1191-1194.

International Search Report issued in connection with PCT/US06/17688 on Sep. 21, 2007.

Written Opinion of the International Searching Authority issued in connection with PCT/US06/17688 on Sep. 21, 2007.

Schultz et al., "Multiframe Integration via the Projective Transform with Automated Block Matching Feature Point Section", ICASSP 99, 1999, pp. 3265-3268.

* cited by examiner

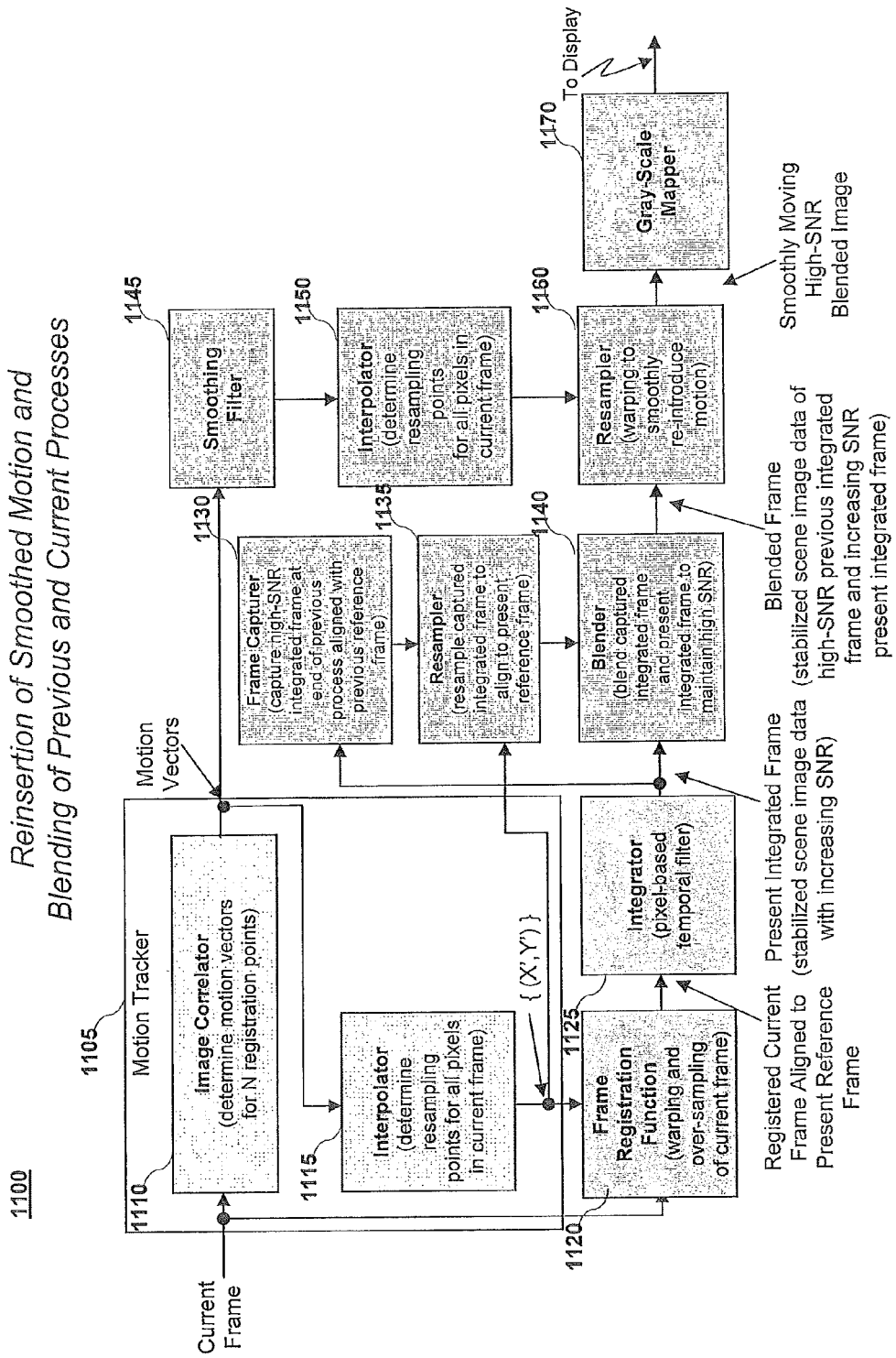

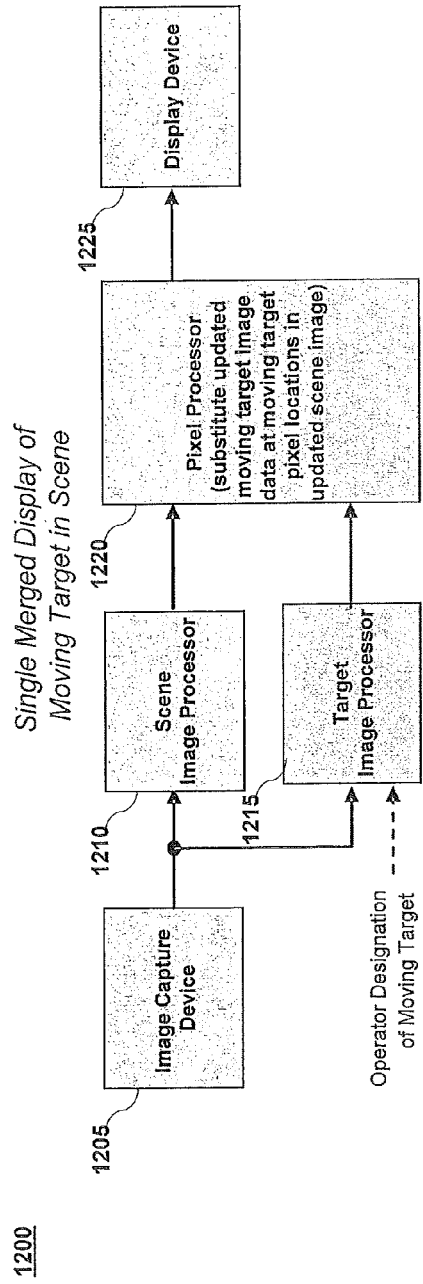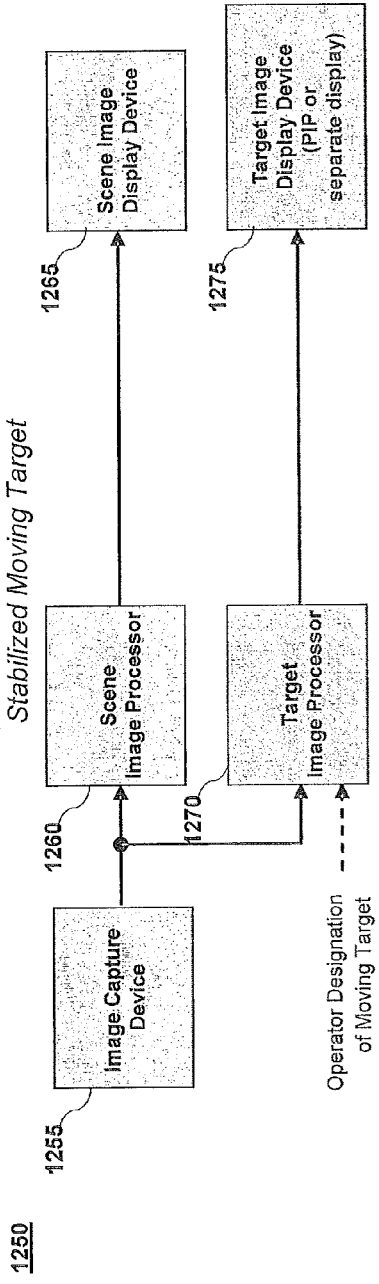

CONTINUOUS EXTENDED RANGE IMAGE PROCESSING

CROSS-REFERENCE TO RELATED APPLICATIONS

This application is a divisional of U.S. application Ser. No. 11/429,958, filed May 9, 2006 and claims the benefit of U.S. Provisional Patent Application No. 60/678,775, filed May 9, 2005, both of which are incorporated by reference herein in their entirety.

BACKGROUND

Electro-optical (EO) systems are often used for "remote sensing." The term "remote sensing" generally refers to the acquisition and measurement of data/information related to one or more properties of a phenomenon, object, or material by a device not in physical contact with the object under surveillance. Imaging techniques often involve gathering information by measuring electromagnetic fields, electromagnetic radiation, or acoustic energy using cameras, radiometers, scanners, lasers, radio frequency receivers, radar systems, sonar, thermal devices, seismographs, magnetometers, gravimeters, scintillometers, and like instruments. For example, such data can be acquired and interpreted to remotely sense information about features associated with a target.

Intelligence gathering, particularly within strategic, tactical, or otherwise hostile military environments, typically use Enhanced Vision (EV) systems technology. Through the use of imaging sensors, such as Charge-Coupled Device (CCD) cameras, Forward-Looking Infrared (FLIR), vidicon cameras, Low Light Level cameras, laser illuminated cameras, or the like, targets can be acquired and imagery can be processed and viewed at long ranges.

With reference to, for example, FLIR systems, remote sensing can refer to the detecting and measuring of electromagnetic energy, usually thermal or photonic, emanating from distant objects made of various materials. Using FLIR imaging, objects can be identified and categorized by, for example, class, type, substance, or spatial distribution.

To facilitate the acquisition and processing of information from EO systems, sensors can be used on a system's front end to generate raw data for processing. Such sensors can be radar imaging sensors, infrared imaging sensors, electro-optic sensors or the like. In each case, information from which image features can be derived can be used to generate image frames which can then be input to, for example, a display system. Image frames can be integrated with other operational features to form a stable display and to allow for such functions as target identification, acquisition, and tracking to be performed. Such systems can be linked to weapons systems to provide guidance input and ordnance control.

SUMMARY

Techniques are provided for image processing. An exemplary method for processing images of a scene comprises: receiving image data of a reference frame and a current frame; generating N motion vectors that describe motion of the image data within the scene by computing a correlation function on the reference and current frames at each of N registration points; registering the image data of the current frame based on the N motion vectors to produce a registered current frame; and updating the image data of the scene based on the registered current frame.

Another exemplary method for processing images of a scene comprises: receiving image data of a reference frame and a current frame; generating N motion vectors that describe motion of the image data within the scene by computing a correlation function on the reference and the current frame at each of N registration points; registering the image data of the current frame to the reference frame based on the N motion vectors to produce a registered current frame; generating an integrated frame by combining the image data of the registered current frame with image data of a previously integrated frame; repeating, for a predetermined period of time, the generating N motion vectors, the registering, and the generating an integrated frame for each subsequent current frame received; and capturing an integrated frame of a first process and designating a reference frame for a second process.

Another exemplary method for processing images of a scene comprises: receiving image data of a reference frame corresponding to a portion of the scene; receiving image data of a current frame corresponding to the portion of the scene; generating N motion vectors that describe motion of the image data within the portion of the scene by computing a correlation function on the reference and current frames at each of N registration points; registering the image data of the current frame based on the N motion vectors to produce a registered current frame; updating the image data of the portion of the scene based on the registered current frame; and repeating the generating N motion vectors, the registering, and the updating, for each subsequent current frame received that corresponds to the portion of the scene.

Another exemplary method for processing an image comprises: receiving image data of a scene having a moving target; processing the image data of the scene by tracking motion of the image data within the scene to produce an updated image of the scene; processing the image data of the target by tracking motion of the image data of the target within the scene to produce an updated image of the target; and simultaneously displaying the updated image of the scene and the updated image of the target.

An exemplary system for processing images of a scene, comprises: means for receiving image data of a reference frame and a current frame; means for generating N motion vectors that describe motion of the image data within the scene, wherein the motion vector generation means is configured to compute a correlation function on the reference and current frames at each of N registration points; means for registering the image data of the current frame based on the N motion vectors to produce a registered current frame; and means for updating the image data of the scene based on the registered current frame.

Another exemplary system for processing images of a scene comprises: means for receiving image data of a reference frame and a current frame; means for generating N motion vectors that describe motion of the image data within the scene by computing a correlation function on the reference and current frames at each of N registration points; means for registering the image data of the current frame to the reference frame based on the N motion vectors to produce a registered current frame; means for generating an integrated frame by combining the image data of the registered current frame with image data of a previously integrated frame; and means for capturing, after a predetermined period of time, an integrated frame of a first process.

Another exemplary system for processing an image comprises: means for receiving image data of a scene having a moving target; means processing the image data of the scene by tracking motion of the image data within the scene to produce an updated image of the scene; means for processing the image data of the target by tracking motion of the image data of the target within the scene to produce an updated image of the target; and means for simultaneously displaying the updated image of the scene and the updated image of the target.

Another exemplary system for processing images of a scene comprises: an image capture device configured to receive image data and a processor configured to process the image data of a reference frame and a current frame. The processor comprises: a motion tracker configured to generate N motion vectors that describe motion of the image data within the scene by computing a correlation function on the reference and current frames at each of N registration points, a frame registration function configured to register the image data of the current frame based on the N motion vectors to produce a registered current frame, and a scene updating filter configured to update the image of the scene based on the registered current frame.

Another exemplary system for processing images of a scene comprises: an image capture device configured to receive image data and a processor configured to process the image data of a reference frame and a current frame. The processor comprises: a motion tracker configured to generate N motion vectors that describe motion of the image data within the scene by computing a correlation function on the reference and current frames at each of N registration points, a frame registration function configured to register the image data of the current frame to the reference frame based on the N motion vectors to produce a registered current frame, a scene updating filter configured to generate an integrated frame by combining the image data of the registered current frame with image data of a previously integrated frame, and a frame capturer configured to capture, after a predetermined period of time, an integrated frame of a first process.

Another exemplary system for processing images of a scene comprises: an image capture device configured to receive image data of a scene having a moving target; a scene image processor configured to process the image data of the scene by tacking motion of the image data within the scene to produce an updated image of the scene; a target image processor configured to process the image data of the target by tracking motion of the image data of the target within the scene to produce an updated image of the target; and a display device configured to simultaneously display the updated image of the scene and the updated image of the target.

BRIEF DESCRIPTION OF THE DRAWINGS

Other objects and advantages of the invention will become apparent to those skilled in the relevant art(s) upon reading the following detailed description of preferred embodiments, in conjunction with the accompanying drawings, in which like reference numerals have been used to designate like elements, and in which:

FIG. 11 illustrates a diagram of an example system/process flow for reinsertion of smoothed motion and blending of current and previous processes upon re-initialization; and FIGS. 12A and 12B illustrate example system diagrams for parallel moving target and scene image processing techniques implemented with a single merged display and separate displays, respectively.

DETAILED DESCRIPTION

A detailed description of systems and methods for image processing is presented below. The systems and methods can be employed to process sensor video, improving resolution, sensitivity, and stabilization, so that target detection, recognition and identification can be achieved at increased ranges. The systems and methods can also be employed to process a full image, over-sample it, and improve the signal-to-noise ratio (SNR), giving an operator real-time, continuous, full field-of-view (FOV) resolution improved, stabilized, and noise reduced video. In an exemplary embodiment, the systems and methods can employ temporal based processing to achieve a SNR improvement, and a line-of-sight dither to achieve sub-pixel sampling and a resulting resolution improvement with the correct processing. In another exemplary embodiment, the systems and methods can achieve spatial and temporal noise reduction for streaming video. In one or more embodiments, the systems and methods can process a sequence of images of a scene by over-sampling, registering, and integrating of image frames. These and further aspects of the systems and methods will be described in the following sections. The explanation will be by way of exemplary embodiments to which the present invention is not limited.

Baseline System

Figure 1:
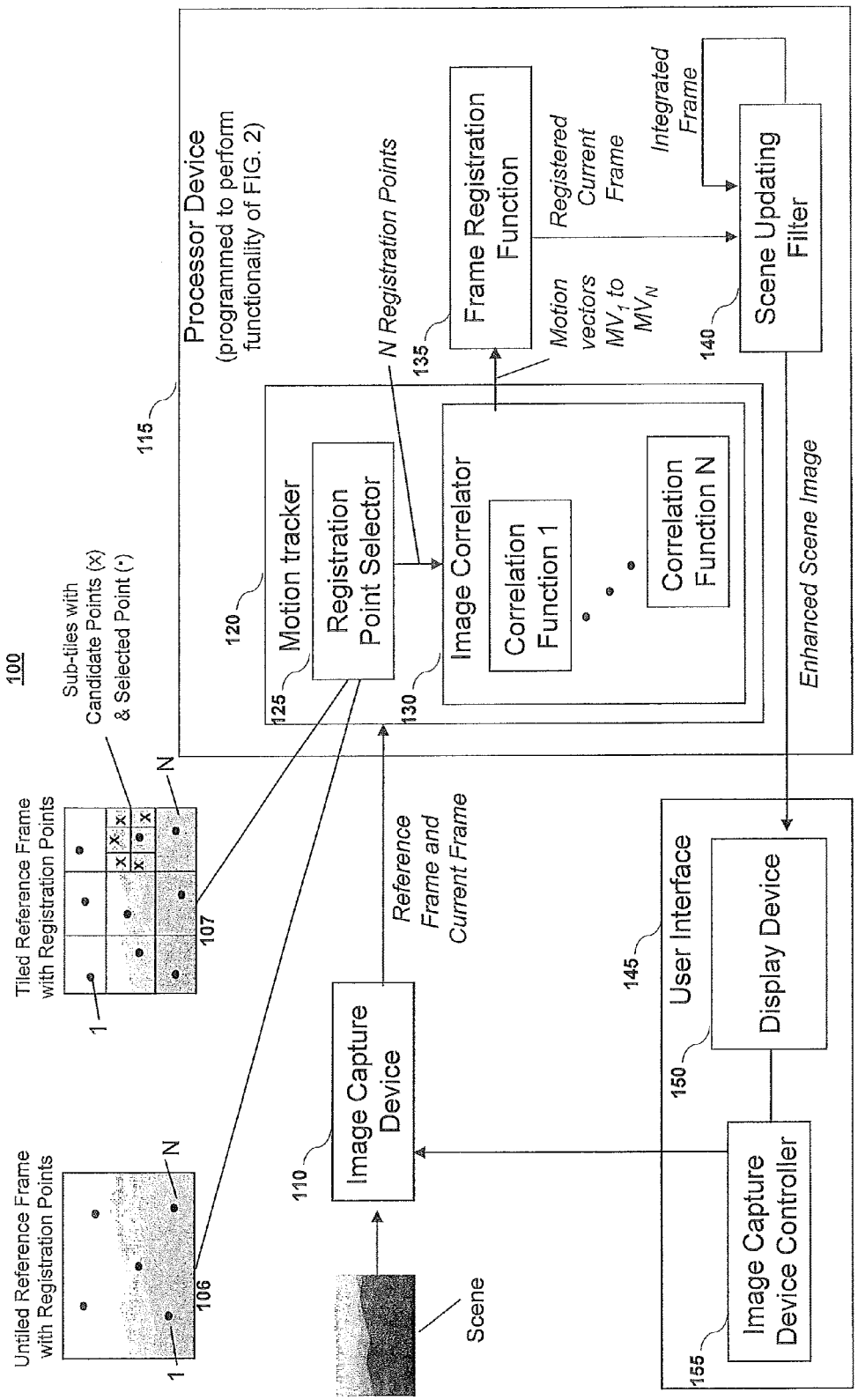
FIG. 1 illustrates a high-level diagram of a baseline system for processing a sequence of images of a scene.

According to an exemplary embodiment, FIG. 1 illustrates a high-level diagram of a baseline system 100 for processing a sequence of images of a scene. System 100 includes means for receiving image data of a reference frame and a current frame. In one implementation, the means for receiving image data of a reference frame and a current frame can be implemented with image capture device 110, such as radar imaging sensors, infrared imaging sensors, electro-optic sensors, or the like. In one implementation, image capture device 110 captures a first frame of image data as the reference frame.

As shown in FIG. 1, system 100 further includes a user interface 145 having an image capture device controller 155 and a display device 150. An operator can use image capture device controller 155, such as a joystick or the like, to control which portion of the scene is captured by image capture device 110, and can view processed images of the scene on the display device 150, such as a liquid crystal display (LCD).

System 100 further includes means for generating N motion vectors by computing N correlation functions on the current frame and reference frame, means for registering the image data of the current frame based on the N motion vectors, and means for updating the image of the scene. System 100 can be employed in conjunction with a computer-based system, where the elements can be implemented in hardware, software, firmware, or combinations thereof. Thus, in one implementation, system 100 includes processor device 115, and the means for generating N motion vectors can be implemented with a motion tracker 120, the means for registering the image data of the current frame can be implemented with a frame registration function 135, and the means for generating an updated image of the scene can be implemented with a scene updating filter 140 of processor device 115.

Figure 5:
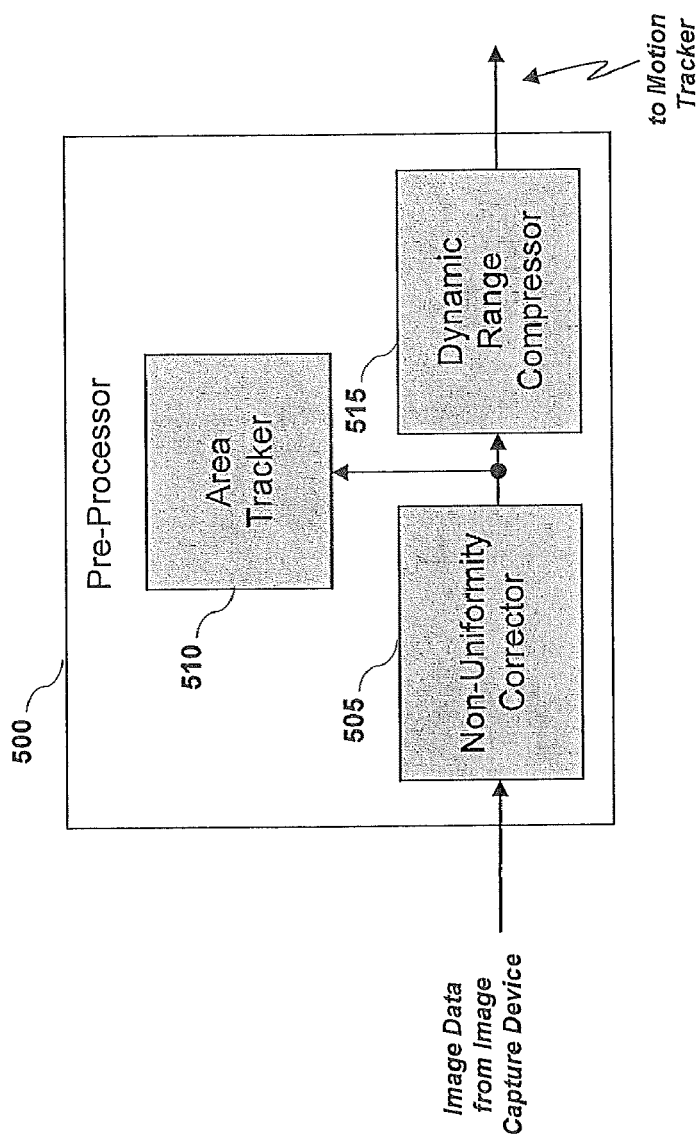
FIG. 5 illustrates a diagram of an optional pre-processor for processing raw image data.

In one implementation, system 100 also includes a pre-processor device 500, shown in FIG. 5, configured to process raw image data captured by the image capture device 110. As shown in FIG. 5, pre-processor device 500 can include a non-uniformity corrector 505, an area tracker 510, and a dynamic range compressor 515. If the image capture device 110 does not perform non-uniformity correction (NUC) or performs inadequate NUC, non-uniformity corrector 505 can be configured to remove large magnitude non-uniformities, such as dead pixels, in the image data. Dynamic range compressor 515 can be configured to compress the image data into a smaller numeric range, thereby reducing the number of bits and improving the visibility of the scene detail to the human eye. U.S. Pat. No. 6,973,218 describes a dynamic range compression algorithm, and is herein incorporated by reference in its entirety. Optionally, pre-processor device 500 includes area tracker 510. Area tracker can be configured to adjust the position of image capture device 110 such that a portion of interest of a scene is maintained in the captured image. In one implementation, an operator can use the image capture device controller 155 to identify the portion of interest in the scene.

As shown in FIG. 1, processor device 115 includes motion tracker 120. Motion tracker 120 is configured to generate N motion vectors that describe the motion of the image data within the scene by computing N correlation functions on the current frame and the reference frame. That is, motion tracker 120 identifies how the image data within the scene has moved from the time the reference frame was captured to the time the current frame was captured.

Motion tracker 120 includes means for selecting the N registration points, which can be implemented with a registration point selector 125. Registration point selector 125 can be configured to select the best N pixels of the reference frame for performing the registration. For example, in one implementation, a non-tiled approach can be employed in which the registration point selector 125 can identify pixels of the reference frame having the highest intensity values, or apply an edge operator to the reference frame and identify pixels having sufficient edge content. The registration point selector 125 can then select the N registration points from the identified pixels. In selecting the N registration points, the registration point selector might consider a distance between identified pixels, a distance of an identified pixel from an edge of the frame, and whether an identified pixel has been flagged as a bad pixel location. FIG. 1 shows an example un-tiled reference frame 106 with N=5 registration points selected.

In another implementation, a tiled approach can be employed in which the registration point selector 125 is configured to divide the reference frame into N tiles, and further divide each of the N tiles into a plurality of sub-tiles. The registration point selector 125 can then identify a candidate registration point for each sub-tile. For example, the registration point selector 125 might identify the candidate registration points based on an intensity or an edge metric value. Then, for each tile, the registration point selector 125 can select one of the identified candidate registration points to obtain the N registration points. For example, the registration point selector 125 might apply an autocorrelation function to select, for a given tile, the candidate registration point that produces the largest value of zero lag to average non-zero lag values of the autocorrelation function. FIG. 1 shows an example tiled reference frame 107 with N=9 registration points selected, in addition to one tile showing the plurality of sub-tiles with candidate registration points identified.

As shown in FIG. 1, motion tracker 120 also includes an image correlator 130 configured to compute a correlation function at each of the N registration points selected by registration point selector 125. Image correlator 130 can be implemented as several correlators to calculate centroid data of scene contours, which allow scene motion to be tracked. The correlators can employ a moving target image correlation and tracking technique, which is described in detail below. Contour-finding routines can be employed to automatically place the starting points for the tracks (i.e., the N registration points).

Based on the computed correlation functions, motion tracker 120 generates N motion vectors (shown as $MV_1$ to $MV_N$ in FIG. 1) that describe the motion of the image data within the scene. Advantageously, motion tracker 120 can be configured to track not only horizontal and vertical motion (i.e., shift), but also roll, zoom, optical flow, which describes sensor-to-scene relative motion (i.e., the illusion of closer portions of the scene appearing to move faster than more distant portions), and local area random motion. Implementations of motion tracker 120 for calculating roll, zoom, shift and optical flow are described in more detail below in conjunction with FIGS. 6A-6B and 7A-7B. Using the motion vectors $MV_1$ to $MV_N$, the motion tracker 120 can convert a set of (X,Y) pixels locations of an integrated frame of previously registered image frames (where the integrated frame is spatially aligned to the reference frame) to a set of pixel locations (X',Y') for resampling the current image frame.

As shown in FIG. 1, processor device 115 includes frame registration function 135, which is configured to register the image data of the current frame based on the N motion vectors generated by the motion tracker 120 and produce a registered current frame. The frame registration function 135 can produce a registered current frame that is spatially aligned to the reference frame. One of skill in the relevant art(s) will understand that frame registration function 135 can also be configured to register the reference frame to the current frame. The frame registration function 135 is typically implemented with a bilinear interpolator, bi-quadratic interpolator, bi-cubic interpolator, or the like. Because, in general, the set of pixel locations (X',Y') for resampling the current image frame are non-integer values, the frame registration function 135 can interpolate the non-integer value locations to obtain integer value pixel locations in the current frame. The operation of the frame registration function 135 can vary, however, according to whether the motion tracker 120 implements a RZS or optical flow calculation, as described in more detail below in conjunction with FIGS. 6A-6B and 7A-7B.

Horizontal and vertical shift is only one of four motion artifacts that can be accounted for by system 100. Shift can be accounted for simply by shifting the current image over by the correct pixel amount via the frame registration function 135. Zoom or magnification (during target closure) can be accounted for by zooming the current image by an amount needed to account for a target size change with frame registration function 135. Roll can be accounted for by rolling the current image the same amount via frame registration function 135. Optical flow due to sensor-to-scene relative motion (i.e., the illusion of closer portions of the scene appearing to move faster than more distant portions) can be accounted for by using a vertical and horizontal mapping of the flow, which can be backed out with frame registration function 135, thus warping the current frame to be registered to an integrated frame of previously registered frames (or vice versa). Local area random image motion can also be accounted for by system 100.

Processor device 115 also includes scene updating filter 140, which updates the image of the scene based on the registered current frame. The scene updating filter 140 can be implemented with a temporal filter, which may optionally be adaptive on a pixel-by-pixel basis, or the like. In general, the scene updating filter 140 can be configured to combine a proportion of previously processed image frames and a proportion of the current processed image frame, to produce a SNR improved (SNRI) integrated image frame that is spatially aligned to the reference frame. The combining can be accomplished on a pixel-to-pixel basis, thereby alleviating blurring artifacts induced by running a temporal filter on non-static imagery.

Scene updating filter 140 can be configured to determine on a pixel-by-pixel basis whether or how much to integrate a pixel of the registered current frame in the integrated frame. Portions of the registered current image frame that contain little to no motion can be combined with the integrated frame, typically achieving greater than an order of magnitude noise reduction over nominal sensor/image capture device noise. Portions of the registered current frame that contain excessive motion should not combined or weighted as heavily in the integrated frame. The operation of the scene updating filter 140 can vary, however, according to two different approaches, a switch-based approach and an intermediate integration approach, which are described in conjunction with FIGS. 9A-9B and 10A-10B.

When image motion occurs within the scene, portions of the scene are removed as a function of a line-of-sight angle and new portions of the scene are introduced. When new image data is flowed into the scene updating filter 140, integration begins for the new pixel values. Therefore, for a short interval, these new portions of the scene have less noise reduction than portions that have been resident in the scene updating filter 140 longer. For example, FIGS. 8A-8C illustrate a scene with image data in motion at $time_0$, $time_1$, and $time_2$, respectively.

Figure 8A:
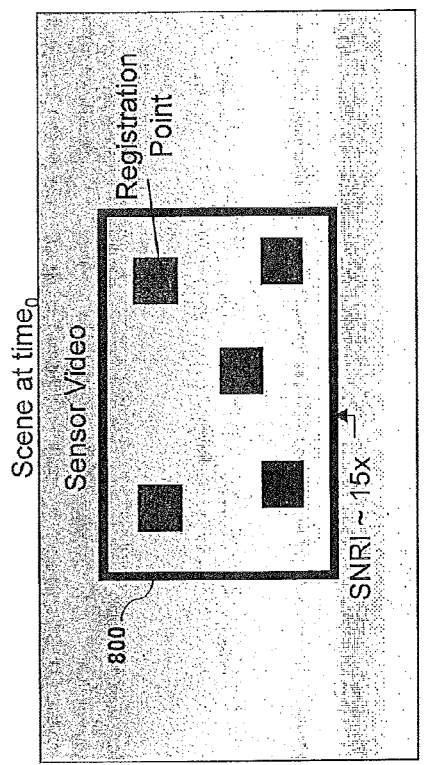
FIGS. 8A-8C illustrate sensor video as a window moving across a scene at three different time instants, and the resultant deletion and addition of correlation registration points.
Figure 8C:
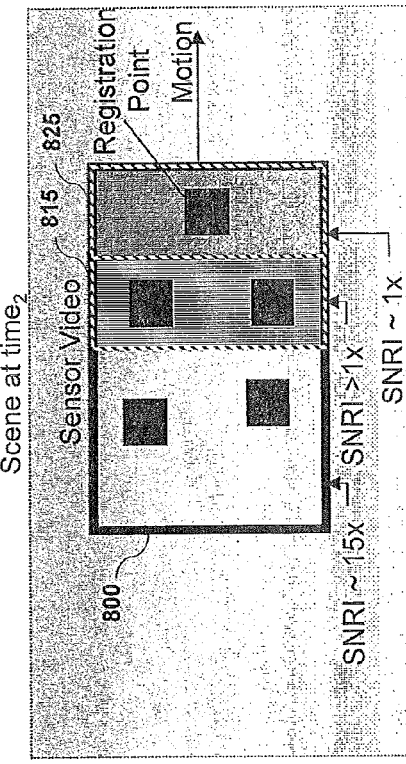
Figure 8B:
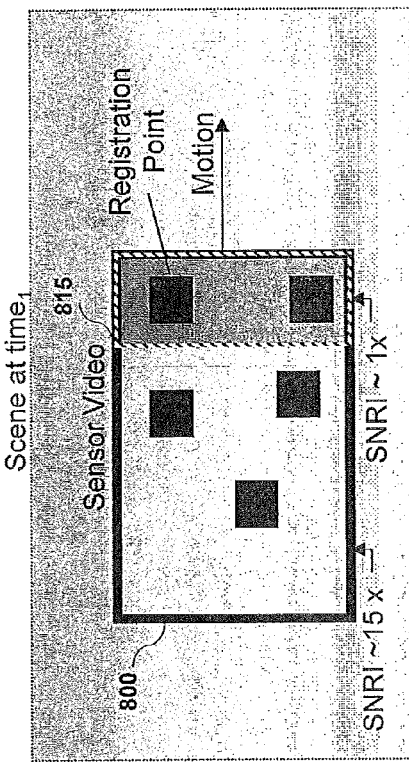

In FIG. 8A, image data 800 of the scene has been resident in the scene updating filter 140 for some time, and therefore reflects significant noise reduction (e.g., SNRI is approximately 15x). In FIG. 8B, the scene includes a portion of old image data 800, in addition to a portion of new image data 815. Because image data 815 has not been resident in the scene updating filter 140, image data 815 has not been noise reduced (e.g., SNRI is approximately 1x). Similarly, in FIG. 8C, the scene includes portions of old image data 800 and 815, and a portion of new image data 820. Image data 800 remains the most noise reduced, while image data 815, having been resident in the scene updating filter 140 longer, is more noise reduced than in FIG. 8B (e.g., SNRI is now greater than 1x). New image data 820 is not noise reduced (e.g., SNRI is approximately 1x). Based on the implementation of the scene updating filter 140, the portions of the scene with less noise reduction should quickly approach the SNRI of neighboring scene portions. Thus, the SNRI is usually at its lowest value near the edges of the scene where the impacts of motion are strongest, i.e., where pixels are constantly being added to the image and newly integrated in the scene updating filter 140.

System 100 further includes display device 150. Display device 150 can be configured to display an enhanced image of a scene output from scene updating filter 140.

Top-Level Process Flow

Figure 2:
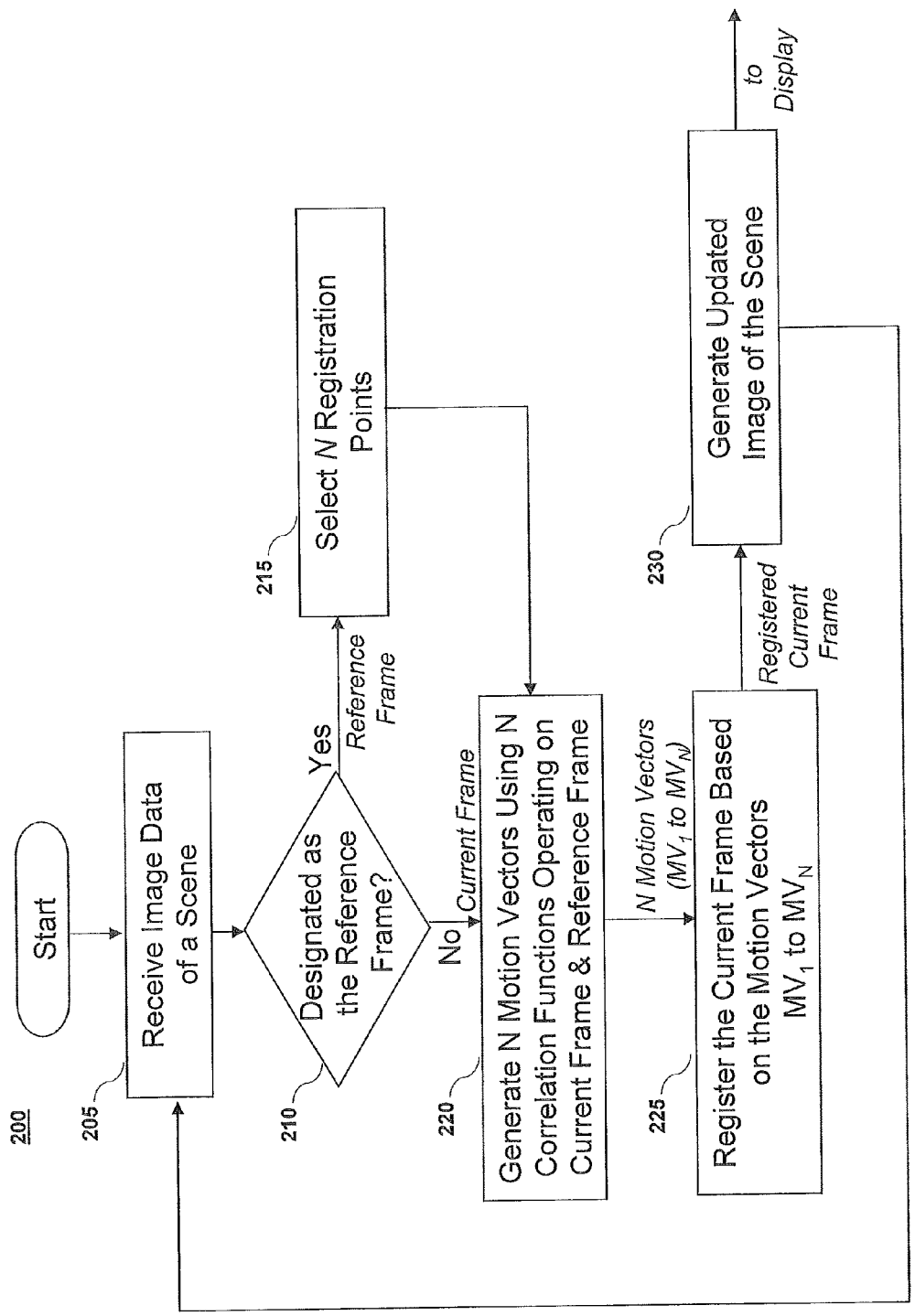
FIG. 2 is a process flowchart illustrating exemplary high-level steps for processing a sequence of images of a scene.

According to an exemplary embodiment, FIG. 2 illustrates a process flowchart 200 illustrating exemplary high-level steps for processing a sequence of images of a scene. Not all of the steps of FIG. 2 have to occur in the order shown, as will be apparent to persons skilled in the relevant art(s) based on the teachings herein. Other operational and structural embodiments will be apparent to persons skilled in the relevant art(s) based on the following discussion. These steps are described in detail below.

In step 205, image data of a scene is received. For example, image capture device 110, shown in FIG. 1, can be employed to capture the image data. In step 210, it is determined whether the image data is designated as a new reference frame. For example, at the beginning of a process, the initial frame of image data can be designated as the reference frame, to which subsequent frames of image data can be aligned. If the image data is designated as a new reference frame, then, in step 215, N registration points are selected from the image data of the reference frame. For example, registration point selector 125, shown in FIG. 1, can be employed to select the N registration points. In one implementation, step 215 includes selecting the N registration points from pixels of the reference frame based on at least one of an intensity value and an edge metric value. In another implementation, step 215 includes: dividing the reference frame into N tiles, dividing each of the N tiles into a plurality of sub-tiles, identifying a candidate registration point for each of the sub-tiles, and selecting one of the identified candidate registration points for each of the N tiles. For the latter implementation, step 215 can include identifying the candidate registration points based on an intensity value or an edge metric value, and selecting one of the identified candidate registration points for each of the N tiles based on the shape of an autocorrelation function.

If the image data is not designated as a new reference frame, then, in step 210, the image data is a current frame and process 200 proceeds to step 220. In step 220, N motion vectors ($MV_1$ to $MV_N$) are generated using N correlation functions operating on the current frame and the reference frame to describe motion of the image data within the scene. For example, image correlator 130 of motion tracker 120, shown in FIG. 1, can be configured to compute the correlation function at each of the N registration points.

In step 225, the image data of the current frame is registered to the reference frame based on the N motion vectors ($MV_1$ to $MV_N$) generated in step 220 to produce a registered current frame. For example, frame registration function 135, shown in FIG. 1, can be configured to register the image data of the current frame based on the N motion vectors ($MV_1$ to $MV_N$). In one implementation, the image data of the reference frame is registered to the current frame in step 225.

In step 230, the image of the scene is updated based on the registered current frame. For example, scene updating filter 140, shown in FIG. 1, can be configured to update the image of the scene based on the registered current frame and forward the updated scene image to display device 150. After step 230, process 200 returns to step 205 to receive new image data, and steps 210-230 can be repeated for the new image data.

Registration Techniques

In an exemplary embodiment, registration of frames can be accomplished by detecting scene motion and removing relative motion by a mapping of the pixel locations in the reference frame to corresponding locations in the current frame to be registered. The product of the registration is a set of, in general, non-integer X-Y pixel locations for which samples of the current image frame can be produced.

Additionally, in another exemplary embodiment, a line-of-sight dither can be applied to the sensor/image capture device. The amount of sensor dither does not have to be known. The purpose of the dither is to reduce the effective sub-pixel sampling interval in the integrated image, resulting in an effective Nyquist spatial frequency of the integrated image that is a multiple of the native single-frame Nyquist spatial frequency of the sensor/image capture device. In other words, after registering frames, the sample points from one frame can be in-between the sample points of the previous frame because of the dither. This effect causes the average interval between samples taken over several frames to be a fraction of the single-frame sampling interval. The image shift that this dither induces can be calculated and removed by registering the images before integration using information derived from the motion tracker 120. The images are typically resampled at a sub-multiple of an original sample spacing to produce registered oversampled image frames that can be subsequently integrated. The result of integrating these oversampled images can greatly reduce aliasing that may have been present in the original images.

Figure 6A:
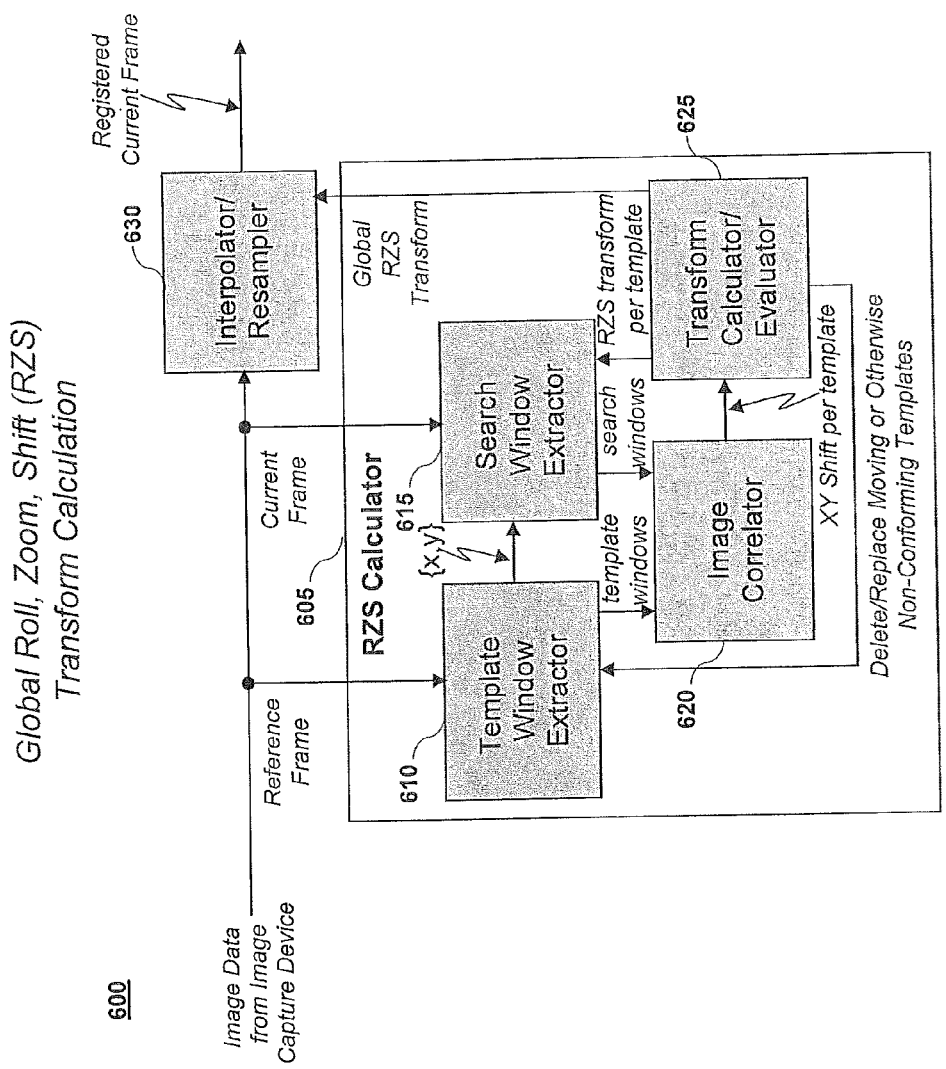
FIGS. 6A and 6B illustrate diagrams of an example system and process flow, respectively, for processing an image of a scene according to a roll, zoom, shift (RZS) calculation.
Figure 7A:
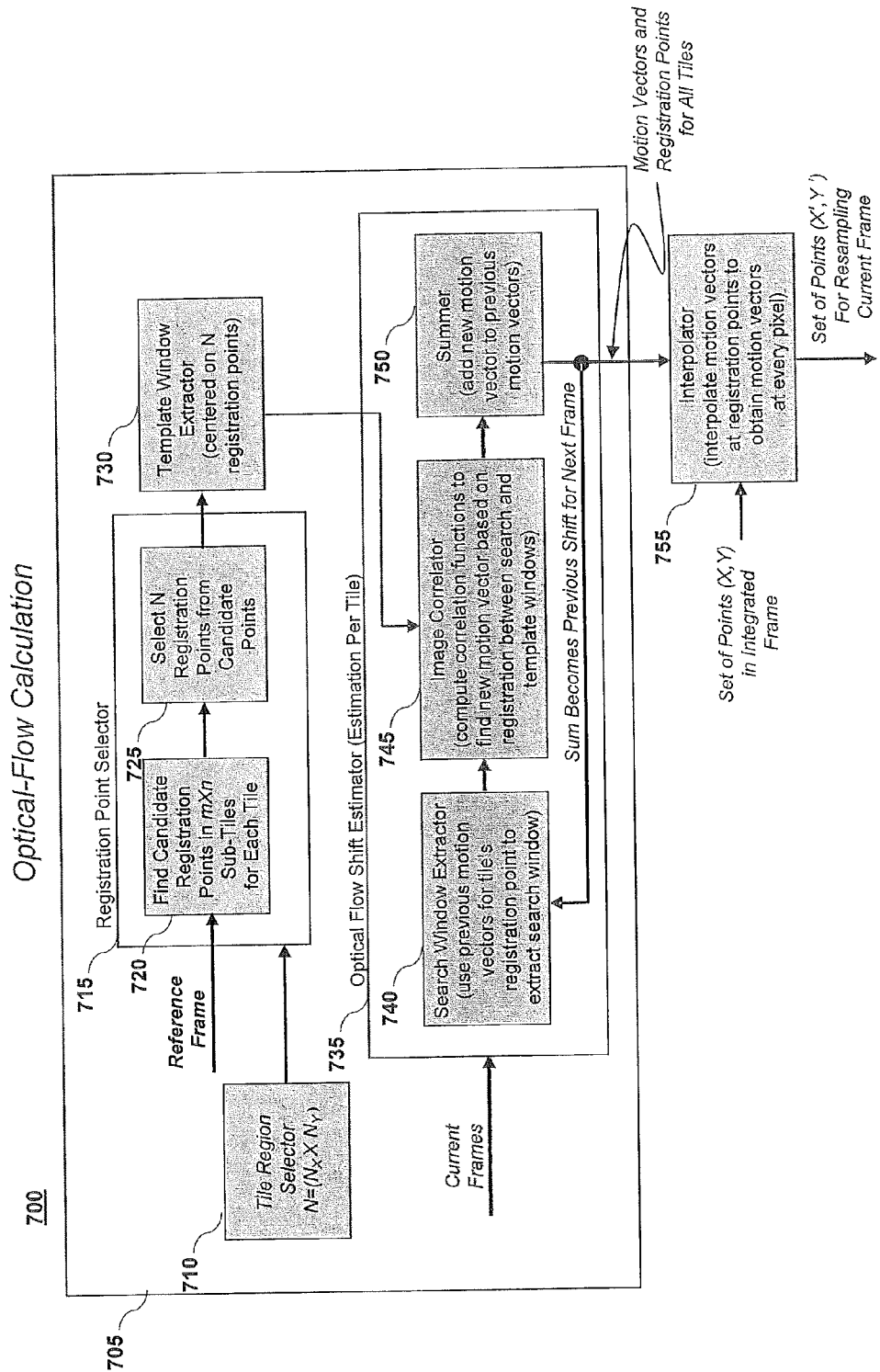
FIGS. 7A and 7B illustrate diagrams of an example system and process flow, respectively, for processing an image of a scene according to an optical flow calculation.

According to one or more exemplary embodiments, motion tracker 120 of FIG. 1 can be configured to generate N motion vectors in accordance with a roll, zoom, shift (RZS) calculation, which is described in conjunction with FIG. 6A, and/or an optical flow calculation which is described in conjunction with FIG. 7A. The RZS calculation can be effective for scenes that can be approximated by an image projected onto a flat plane. An example application might include taking ground imagery from an aircraft flying at an altitude that makes deviations from a flat-earth model insignificant compared with the range from the sensor to the ground. The optical flow calculation, on the other hand, can be effective for scenes that cannot be readily approximated by an image projected onto a flat plane. An example application might include taking imagery from a moving ground vehicle. Additionally, the RZS calculation is typically less computationally intensive than the optical-flow calculation. In one implementation, motion tracker 120 of FIG. 1 can implement both a RZS calculator and an optical flow calculator in a cascaded fashion. In another implementation, motion tracker 120 can include both the RZS calculator and the optical flow calculator, and can be configured to automatically select one of the calculators based on sensed range dynamics of the scene, or can be configured to enable an operator to select one of the calculators, as desired.

Roll, Zoom Shift (RZS) Calculation

In one implementation, motion tracker 120 of FIG. 1 includes means for calculating a roll, zoom, shift (RZS) transform of the image data of the scene. For example, the means for calculating a RZS transform of the image data of the scene can be implemented as a RZS calculator 605, shown in FIG. 6A. FIG. 6A shows an example implementation of a system 600 for processing an image of a scene according to a RZS calculation. In one example, registration point selector 125, shown in FIG. 1, selects the N registration points according to a non-tiled approach.

As shown in FIG. 6A, RZS calculator 605 includes means for extracting N template windows centered on each of the N registration points, which can be implemented with template window extractor 610. RZS calculator 605 also includes means for extracting a corresponding search window in the current frame for each of the N template windows, which can be implemented with search window extractor 615. When the image data is designated to be the reference frame, the search window and template window extractions can be centered upon the N registration points. Subsequent search window extractions, however, can be centered based on last known positions of the N registration points in a previously registered frame. Optionally, the search window can be transformed with an image interpolator such that its aspect is equivalent to the template aspect. In this case, the RZS that was used to register the previous current frame to the reference frame is used to resample the current frame before extracting the search windows at the N registration points.

RZS calculator 605 also includes means for computing the correlation function for each template and corresponding search window to generate N corresponding motion vectors, which can be implemented with image correlator 620. In one example, the image correlator 620 can move a template window to all possible locations in a corresponding search window and computes a correlation function at each of the locations, producing a correlation surface. From the correlation surface, the image correlator 620 can determine a motion vector for the registration point. The image correlator can employ a centroider, which determines the (in-general) non-integer X-Y pixel shifts that have occurred between the previous frame and the current frame based on the correlation values for the integer-shift positions of the template window relative to the search window. The resulting (in-general) non-integer motion vector from a pair of registration points can be used to compute the incremental RZS that has occurred between the previous frame and the current frame. Various metrics of correlation may be used for the correlator employed in the image correlation function 620, such as conventional correlation or the use of the mean absolute difference (MAD). If MAD is employed, the centroider would find the centroid of a surface minimum rather than a surface maximum.

RZS calculator 605 also includes means for generating a motion transform based on pairings of the N motion vectors, which can be implemented with transform calculator/evaluator 625. RZS of the image data of the current frame can be calculated from motion vectors from any two registration points. Thus, in one implementation, the transform calculator/evaluator 625 can calculate a global RZS transform based on RZS transforms calculated for all possible pairings of the N motion vectors. In another implementation, the transform calculator/evaluator 625 can compare the RZS transforms calculated for each pairing to determine a quality metric of each transform. Poor quality transforms can be related back to their corresponding registration points and the registration point selector 125 can be prompted to select new registration points.

As shown in FIG. 6A, system 600 also includes means for registering the image data of the current frame, which can be implemented with interpolator/resampler 630. The interpolator/resampler 630 includes means for applying the global RZS transform to each pixel location of an oversampled integrated frame of previously registered oversampled frames to obtain corresponding pixel locations in the current frame. Thus, the global RZS transform generated by the transform calculator/evaluator 625 can be used to transform a set of (X,Y) points of the oversampled integrated image frame to a set of points (X',Y') needed to resample the current image frame. The interpolator/resampler 630 also includes means for resampling the current frame at each of the corresponding pixel locations in the oversampled integrated frame to produce a registered oversampled current frame.

Figure 6B:
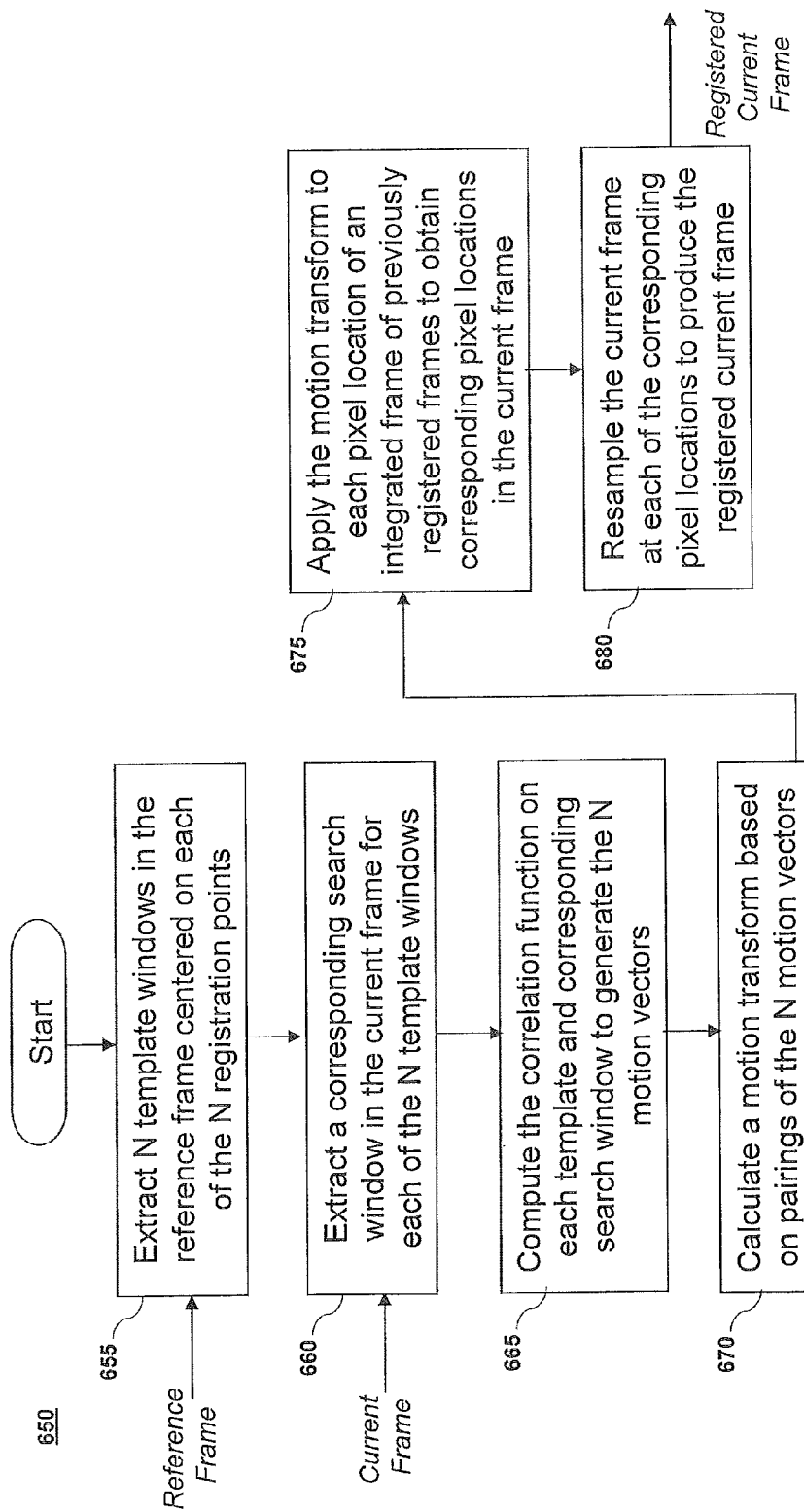

FIG. 6B illustrates a process flowchart illustrating exemplary high-level steps for processing an image of a scene according to a roll, zoom, shift (RZS) calculation. Not all of the steps of FIG. 6B have to occur in the order shown, as will be apparent to persons skilled in the relevant art(s) based on the teachings herein. Other operational and structural embodiments will be apparent to persons skilled in the relevant art(s) based on the following discussion. These steps are described below.

In one implementation, steps 655-670 of process 650 can implement step 220 of process 200, shown in FIG. 2. In step 655, N template windows are extracted in the reference frame centered on each of the N registration points. For example, template window extractor 610 can be employed to implement step 655. In step 660, a corresponding search window is extracted in the current frame for each of the N template windows. For example, search window extractor 615 can be employed to implement step 660. In step 665, the correlation function is computed on each template and corresponding search window to generate the N motion vectors. For example, image correlator 620 can be employed to implement step 655. In step 670, a motion transform based on pairings of the N motion vectors is calculated that describes the roll, zoom, shift of the image data within the scene. For example, transform calculator/evaluator 625 can be employed to implement step 670.

In one implementation, steps 675-680 of process 650 can implement step 225 of process 200, shown in FIG. 2. In step 675, the motion transform is applied to each pixel location of an integrated frame of previously registered frames to obtain corresponding pixel locations in the current frame. In step 680, the current frame is resampled at each of the corresponding pixel locations to produce the registered current frame. For example, interpolator/resampler 630 can be employed to implement steps 675 and 680. The output of process 650 is the registered current frame.

Optical Flow Calculation

In one implementation, motion tracker 120 of FIG. 1 includes means for calculating an optical flow of the image data of the scene. For example, the means for calculating an optical flow of the image data of the scene can be implemented with optical flow calculator 705, shown in FIG. 7A. FIG. 7A shows an example system 700 for processing an image of a scene according to an optical flow calculation.

As shown in FIG. 7A, optical flow calculator 705 includes means for defining N tiles of the reference frame, which can be implemented with tile region selector 710. The tile regions need not have identical sizes and can have various shapes, such as square, rectangular, etc.

In one implementation, optical flow calculator 705 also includes means for selecting the N registration points, which can be implemented with registration point selector 715. Registration point selector 715 can be configured to select the N registration points according to a tiled approach. For each tile, an initialization process is performed to find the best registration point within the tile. One method of performing this task is to define m×n sub-regions within the tile, and choose as candidate registration points the maximum pixel within each sub-region of the tile. A test for two-dimensional registration detail in the vicinity of the pixel can be performed on each of the candidate registration points, and the candidate with the highest measure of detail can be chosen as the registration point for that tile. One measure of detail that can be used is a measure of sharpness of the two-dimensional autocorrelation function of a small region around the candidate registration point. Other implementations of this measure can also be used.

Thus, the registration point selector 715 can be configured to divide each of the N tiles of the reference frame into m×n sub-tiles and identify a candidate registration point for each of the sub-tiles, as indicated in block 720. Then, the registration point selector 715 can select the identified candidate registration point with the highest measure of detail for each of the N tiles of the reference frame to obtain the N registration points, as shown in block 725.

As shown in FIG. 7A, optical flow calculator 705 also includes means for extracting a template window for each tile of the reference frame centered upon that tile's registration point, which can be implemented with template window extractor 730. The registration template for a given tile can be extracted as an area surrounding the registration point for that tile. This template window can be maintained for subsequent correlation with a corresponding search window during processing of current frames.

After the N registration points and corresponding template windows for each of the tiles of the reference frame have been selected, optical flow calculator 705 can proceed with processing current frames to calculate, for each current frame, optical flow motion vectors at each of the N registration points. As shown in FIG. 7A, optical flow calculator 705 includes means for extracting, for each tile, a search window in a current frame and means for computing the correlation function of the template window and the search window for each tile to generate the N motion vectors corresponding to the N registration points, which can be implemented with optical flow shift estimator 735.

Optical flow shift estimator 735 includes a search window extractor 740 configured to extract a search window of pixels centered at the expected location of the optically flowed registration point for a given tile of the current frame. This expected location can be determined based on the original registration point location in the reference frame modified by cumulative optical flow motion vectors that have been calculated up to and including the previous current frame. Typically, the dimensions of the search window are larger than those of the template window by an amount of uncertainty in the motion vector that occurs from frame to frame, which can be on the order of a few pixels in each of the X and Y dimensions, but the search window can have other dimensions, as well.

Optical flow shift estimator 735 also includes an image correlator 745 configured to compute a correlation function of the template window and corresponding search window for each tile of the current frame. For example, for a given tile of the current frame, the image correlator 745 can move the template window to possible locations in the corresponding search window and compute a correlation function at each of the locations, producing a correlation surface. From the correlation surface, the image correlator 745 can determine a motion vector for the registration point. The image correlator 745 can employ a centroider, which determines the (in-general) non-integer X-Y pixel shifts that have occurred between the previous frame and the current frame based on the correlation values for the integer-shift positions of the template window relative to the search window. The resulting (in-general) non-integer motion vector for a registration point can be added to the previous cumulative motion vector for that point by employing a summer 750. Various metrics of correlation may be used for the correlator employed by image correlator 745, such as conventional correlation or the use of the mean absolute difference (MAD). If MAD is employed, the centroider would find the centroid of a surface minimum rather than a surface maximum.

The set of N optically flowed motion vectors produced by summer 750 can then be used by search window extractor 740 to extract search windows for the associated registration points of a subsequently processed current frame. The output of the optical flow shift estimator 735 is a set of optical flow motion vectors for the registration points of the tiles of the current frame.

As shown in FIG. 7A, system 700 also includes means for interpolating the optical flow motion vectors for the tiles of the current frame, which can be implemented with interpolator 755. Interpolator 755, such as a bilinear interpolator, can be configured to interpolate the optical flow motion vectors for the tiles of the current frame to generate optical flow motion vectors for resampling each pixel of the current frame. For example, given an optical flow motion vector for a registration point of a particular tile, the interpolator 755 can be configured to calculate on optical flow motion vector for each corner point of the tile based on the optical flow motion vectors of four nearest registration points. Having calculated an optical flow motion vector for all corner points of all the tiles of the current frame, the interpolator 755 can proceed to interpolate optical flow motion vectors for all of the pixels of the current frame.

Thus, the set of optical flow motion vectors needed to transform a set of (X,Y) points in an oversampled integrated image frame to a corresponding set of (X',Y') points in the current image frame can be calculated by bilinear interpolation of the set of optical flow motion vectors for the registration points of the tiles of the current frame. The set of (X',Y') points can then be used by the frame registration function 135 of FIG. 1 to resample the current frame and produce a registered oversampled current frame.

Figure 7B:
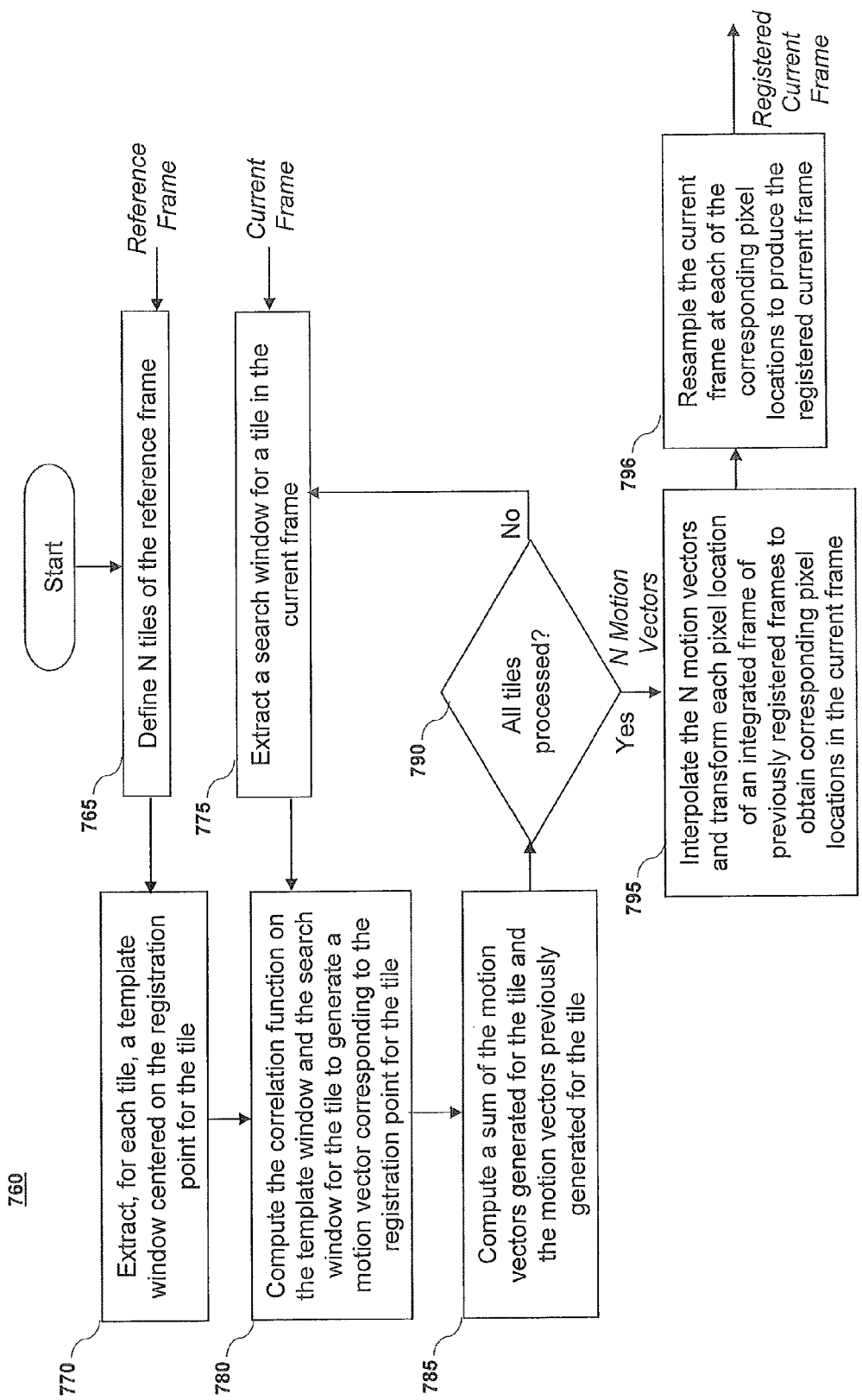

FIG. 7B illustrates a process flowchart illustrating exemplary high-level steps for processing an image of a scene according to an optical flow calculation. Not all of the steps of FIG. 7B have to occur in the order shown, as will be apparent to persons skilled in the relevant art(s) based on the teachings herein. Other operational and structural embodiments will be apparent to persons skilled in the relevant art(s) based on the following discussion. These steps are described below.

In one implementation, steps 765-790 of process 760 can implement step 220 of process 200, shown in FIG. 2. In step 765, N tiles of the reference frame are defined. For example, tile region selector 710 can be employed to implement step 765. In step 770, template windows are extracted for each tile that are centered on the registration points for the tiles. For example, template window extractor 730 can be employed to implement step 770.

In step 775, a search window is extracted for a tile in the current frame. For example, search window extractor 740 can be employed to implement step 775. In step 780, the correlation function is computed on the template window and the search window for the tile to generate a motion vector corresponding to that tile's registration point. For example, image correlator 745 can be employed to implement step 780. In step 785, a sum of the motion vectors generated for the tile and the motion vectors previously generated for the tile is calculated. For example, summer 750 can be employed to implement step 785. In step 790, it is determined whether all tiles have been processed. If all tiles have not been processed, then process 760 returns to step 775, and steps 775-790 are repeated for a next tile. If all tiles have been processed, then process 760 proceeds to step 795. The output of step 790, after all tiles have been processed, is the N motion vectors.

In one implementation, steps 795-796 of process 760 can implement step 225 of process 200, shown in FIG. 2. In step 795, the N motion vectors are interpolated and each pixel location of an integrated frame of previously registered frames is transformed to obtain corresponding pixel locations in the current frame. For example, interpolator 755 can be employed to implement step 795. In step 796, the current frame is resampled at each of the corresponding pixel locations to produce a registered current frame. For example, frame registration function 135 can be employed to implement step 796.

Integration Techniques

According to an exemplary embodiment, re-sampling each current frame using a prescribed pixel-mapping determined during the registration process can produce a sequence of registered current frames that are Nyquist-rate sampled, with respect to the spatial frequency content of the image, and registered to one another. Assuming that the original current frames are sampled at less than half the Nyquist sampling rate, the higher spatial frequency components of the images will likely contain distortion due to aliasing. Then, integration of the registered current frames re-sampled at double or triple (typically) the rate can greatly reduce distortion caused by aliasing of the original current frames and satisfies the Nyquist criterion for further processing. The integration of the registered current frames can also improve the SNR by the square-root of the number of frames integrated.

In an exemplary embodiment, scene updating filter 140 of FIG. 1 can be configured to perform integration to produce an enhanced image of the scene based on the registered current frame. In general, the scene updating filter 140 can be configured to combine a proportion of previously processed image frames and a proportion of newly processed image frames, to produce a SNR improved (SNRI) integrated image frame spatially aligned to the reference frame. Scene updating filter 140 can be implemented in accordance with a switch-based approach, described in conjunction with FIG. 9A, and an intermediate integration approach, described in conjunction with FIG. 10A. In one implementation, scene updating filter 140 can be configured to implement both the switch-based and intermediate integration approaches, and can be configured to automatically select one of the approaches, or can be configured to enable an operator to select one of the approaches, as desired.

Switch-Based Approach

Figure 9A:
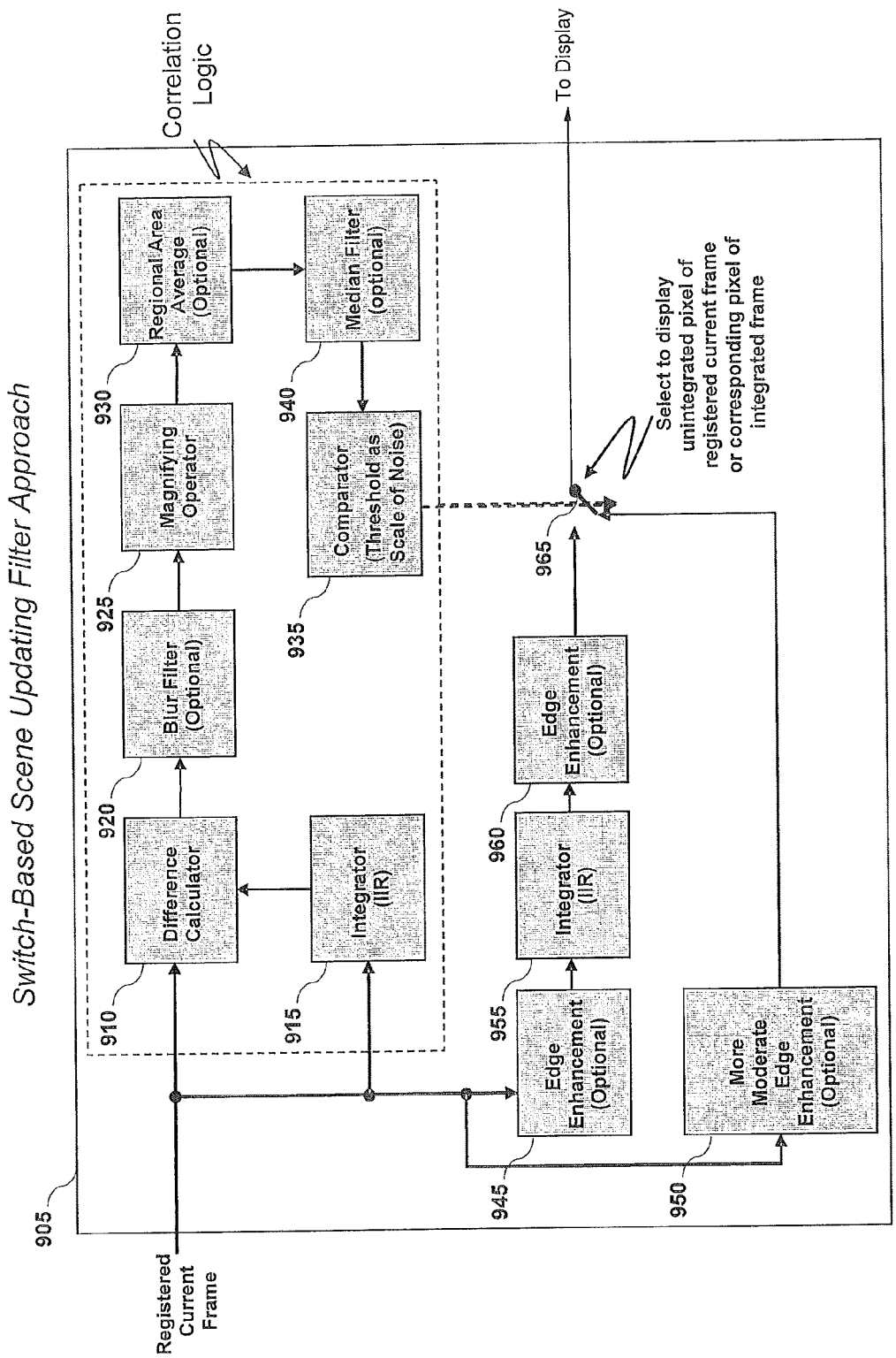
FIGS. 9A and 9B illustrate diagrams of an example system and process flow, respectively, for updating image data of a scene according to a switch-based approach.

FIG. 9A illustrates an example implementation of a scene updating filter 905.

Scene updating filter 905 can be implemented with a pixel-based temporal filter, or the like, which processes the registered current frame and the previously integrated frame on a pixel-by-pixel basis. As shown in FIG. 9A, scene updating filter 905 includes means for combining the image data of the registered current frame with image data of the previously integrated frame to generate a new integrated frame, means for calculating a difference between a pixel of the registered current frame and a corresponding pixel of the integrated frame, and means for comparing the difference to a threshold value to determine whether to display the pixel of the registered current frame instead of the corresponding pixel of the integrated frame.

As shown in FIG. 9A, means for generating an integrated frame by combining the image data of the registered current frame with image data of a previously integrated frame can be implemented with an integrator 915. The integrator 915 can include an infinite impulse response (IIR) filter, or other types of filters that can perform temporal averaging. The integrator 915 can be configured to maintain an integrated image frame, which is a temporal average of the image data of previously registered frames. The means for calculating a difference can be implemented with a difference calculator 910. The difference calculator 910 can be configured to calculate a difference between a pixel of the registered current frame and a corresponding pixel of an integrated frame, from the integrator 915. In one implementation, scene updating filter 905 includes a magnifying operator 925, which can be configured to magnify the difference value by squaring, cubing, or other similar magnifying operations.

Scene updating filter 905 optionally includes a blur filter 920, a regional area averaging filter 930, and a median filter 940. The blur filter 920 can be applied to blur neighboring pixels together to better allow poorly registered pixels or motion to be displayed as current pixels. Similarly, the regional area averaging filter 930 can be applied such that scene updating filter 905 can operate on a region of pixels instead of an individual pixel value. A filter 940 can be applied to accentuate or diminish the difference value. The filter 940 is shown in FIG. 9A as a median filter, but other types of filters can be used to accentuate or diminish the difference value.

Scene updating filter 905 also includes means for determining whether to display the pixel of the registered current frame instead of the corresponding pixel of the integrated frame, which can be implemented with a threshold comparator 935. The threshold comparator 935 can be configured to compare the difference value to a threshold to determine whether to display the pixel of the registered current frame or the corresponding pixel of the integrated frame. In one example, the threshold is correlated to a value of the sensor's/image capture device's temporal noise. Then, if the difference value is below the threshold, the threshold comparator 935 can set a flag indicating that the integrated pixel value from integrator 955 should be displayed. Like integrator 915, integrator 955 can be configured to maintain an integrated image frame, which is a temporal average of the image data of previously registered frames. If the difference value exceeds the threshold, the threshold comparator 935 can set a flag indicating that the pixel value of the registered current frame should be displayed. In this way, scene updating filter 905 can produce an enhanced image of the scene by integrating portions of the scene that did not experience motion for improved SNRI, and by not integrating portions of the scene that experienced motion, or portions of the scene poorly registered by the registration process.

Scene updating filter 905 further includes means for applying a first degree of edge enhancement when the pixel of the registered current frame is displayed, which can be implemented with a moderate edge enhancement filter 950, and means for applying a second degree of edge enhancement when the corresponding pixel of the integrated frame is displayed, which can be implemented with edge enhancement filters 945 and 960. When the threshold comparator 935 indicates that the pixel of the registered current frame should be displayed, only moderate edge enhancement should be applied because the registered current frame has not been integrated and typically contains noise. When the threshold comparator 935 indicates that the pixel of the integrated frame should be displayed, greater edge enhancement can be applied because the integrated frame typically contains less noise.

Based on the output of the threshold comparator 935, scene updating filter 905 can toggle a switch 965 so that the pixel of the registered current frame or the corresponding pixel of the integrated frame from integrator 955 is displayed. Like integrator 915, integrator 955 can include an IIR filter configured to perform temporal integration. If edge enhancement filter 945 is not applied, integrator 955 and integrator 915 can be implemented as a single integrator. Thus, by applying the switch-based approach, scene updating filter 905 can construct an enhanced image of the scene that is a combination of registered current pixels and integrated pixels.

Figure 9B:
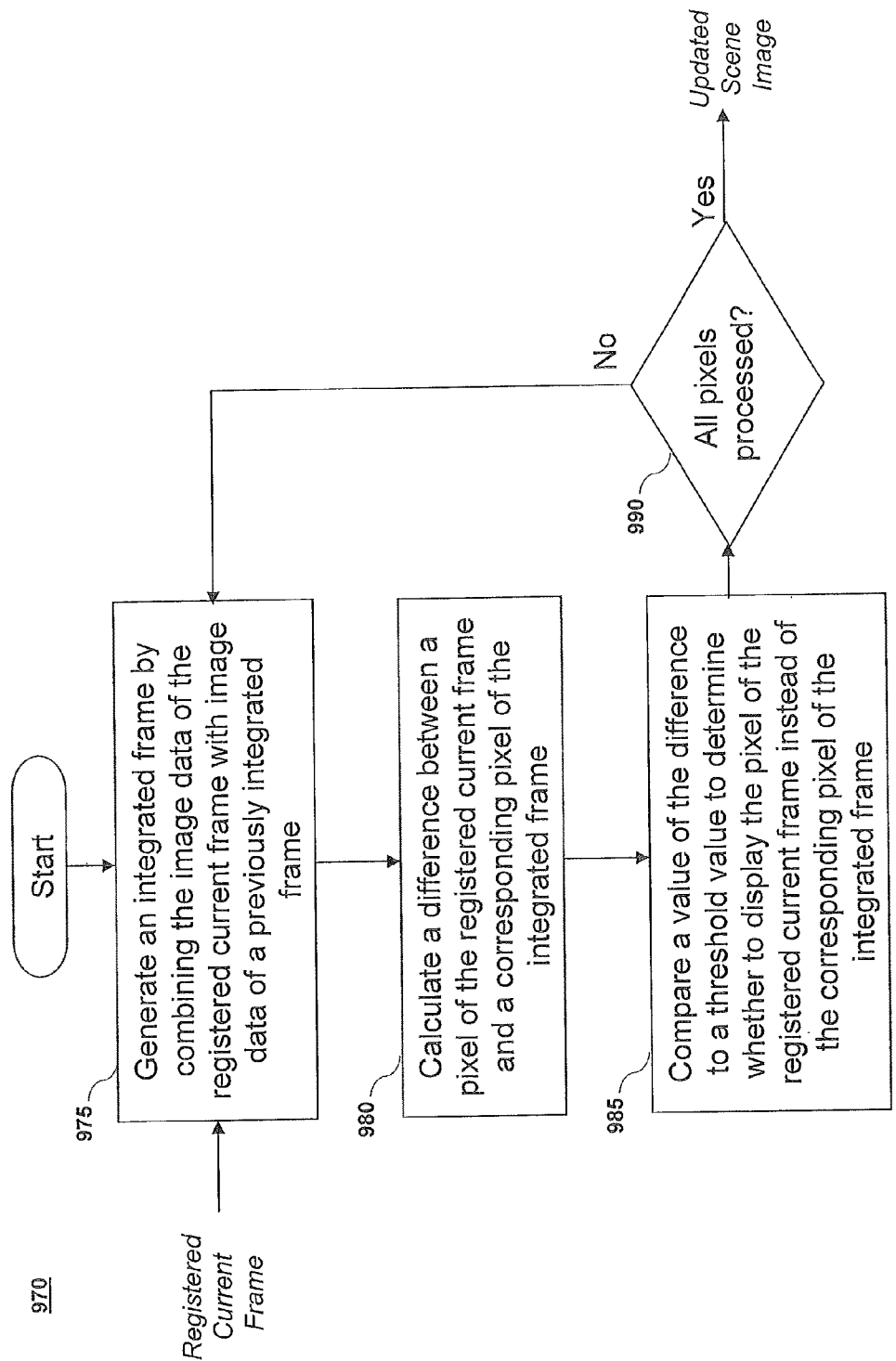

FIG. 9B illustrates a process flowchart illustrating exemplary high-level steps for updating image data of a scene according to a switch-based approach. Not all of the steps of FIG. 9B have to occur in the order shown, as will be apparent to persons skilled in the relevant art(s) based on the teachings herein. Other operational and structural embodiments will be apparent to persons skilled in the relevant art(s) based on the following discussion. These steps are described below.

In one implementation, steps 975-990 of process 970 can implement step 230 of process 200, shown in FIG. 2. In step 975, an integrated frame is generated by combining the image data of the registered current frame with image data of a previously integrated frame. For example, integrator 915 can be employed to implement step 975. In step 980, a difference between a pixel of the registered current frame and a corresponding pixel of an integrated frame is calculated. For example, difference calculator 910 can be employed to implement step 980. In step 985, a value of the difference is compared to a threshold value to determine whether to display the pixel of the registered current frame instead of the corresponding pixel of the integrated frame. For example, threshold comparator 935 can be employed to implement step 985. In step 990, it is determined whether all pixels of the registered current frame have been processed. If all pixels have not been processed, then process 970 returns to step 975, and steps 975-990 are repeated for a next pixel of the registered current frame. If all pixels have been processed, then process 970 outputs for display an updated image of the scene that is a combination of registered current pixels and integrated pixels.

Intermediate Integration Approach

Figure 10A:
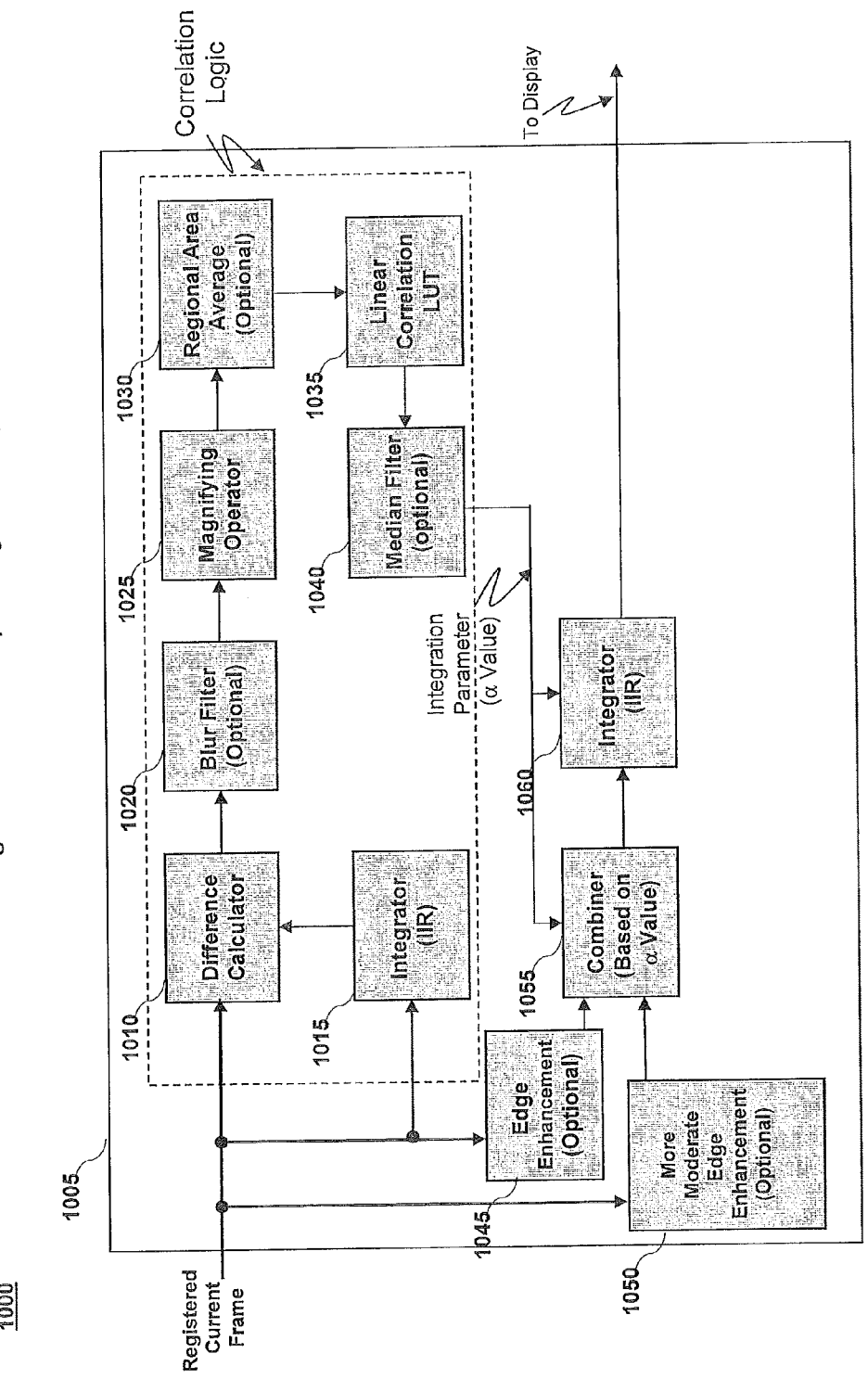
FIGS. 10A and 10B illustrate diagrams of an example system and process flow, respectively, for updating image data of a scene according to an intermediate integration approach.

FIG. 10A illustrates an example implementation of a scene updating filter 1005. Scene updating filter 1005 can be implemented with a pixel-based temporal filter, or the like, which processes the registered current frame on a pixel-by-pixel basis. As shown in FIG. 10A, scene updating filter 1005 includes first means for generating an integrated frame by combining the image data of the registered current frame with image data of a previously integrated frame; means for calculating a difference between a pixel of the registered current frame and a corresponding pixel of the integrated frame; means for determining a value of an integration parameter that corresponds to a value of the difference; and second means for generating an integrated frame by weighting respective amounts of the pixel of the registered current frame and the corresponding pixel of a previously integrated frame that are combined based on the value of the integration parameter.

As shown in FIG. 10A, the first means for generating an integrated frame by combining the image data of the registered current frame with image data of a previously integrated frame can be implemented with integrator 1015. The integrator 1015 can include an IIR filter, or other types of filters that can perform temporal averaging. The integrator 1015 can be configured to maintain an integrated image frame, which is a temporal average of the image data of previously registered frames. The integrator 1015 can be configured to integrate (i.e., temporally average) a pixel of the registered current frame with a corresponding pixel of the integrated frame. The means for calculating a difference can be implemented with a difference calculator 1010. The difference calculator 1010 can be configured to calculate a difference between a pixel of the registered current frame and a corresponding pixel of the integrated frame, from the integrator 1015. In one implementation, scene updating filter 1005 includes a magnifying operator 1025, which can be configured to magnify the difference value by squaring, cubing, or other similar magnifying operations.

Scene updating filter 1005 optionally includes a blur filter 1020, a regional area averaging filter 1030, and a median filter 1040. The blur filter 1020 can be applied to blur neighboring pixels together to better allow poorly registered pixels or motion to be displayed as current pixels. Similarly, the regional area averaging filter 1030 can be applied such that scene updating filter 1005 can operate on a region of pixels instead of an individual pixel value. A filter 1040 can be applied to accentuate or diminish the difference value. The filter 1040 is shown in FIG. 10A as a median filter, but other types of filters can be used to accentuate or diminish the difference value.

Scene updating filter 1005 also includes means for determining a value of an integration parameter that corresponds to the difference value, which can be implemented with a lookup table (LUT) 1035. The lookup table 1035 is shown in FIG. 10A as a linear correlation LUT, but could be implemented with other types of LUTs. The lookup table can be configured to include values of an integration parameter ($\alpha$), which dictates a degree of integration of the pixel of the registered current frame.

Scene updating filter 1005 further includes means for applying a degree of edge enhancement based on the value of the integration parameter, which can be implemented with an edge enhancement filter 1045 and a moderate edge enhancement filter 1050. If the pixel of the registered current frame is weighted more in the integrated frame, then only moderate edge enhancement should be applied using moderate edge enhancement filter 1050, due to the presence of more noise. If the pixel of the registered current frame is weighted less in the integrated frame, then greater edge enhancement can be applied using edge enhancement filter 1045, due to the presence of less noise. A combiner 1055 can be configured to vary and combine amounts of edge enhancement applied by edge enhancement filter 1045 and edge enhancement filter 1050 according to the value of the integration parameter.

Scene updating filter 1005 further includes second means for generating an integrated frame by weighting respective amounts of the pixel of the registered current frame and the corresponding pixel of a previously integrated frame that are combined based on the value of the integration parameter, which can be implemented with an integrator 1060. For example, integrator 1060 can be configured to calculate a value of a pixel in a new integrated frame y(n) as a weighting of a value of the corresponding pixel in the previously integrated frame y(n−1) plus a value of the pixel in the registered current frame x(n), as shown in equation (1). In this case, for small values of $\alpha$, more of the pixel of the previously integrated frame and less of the pixel of the registered current frame will be included in the new integrated frame.

$$y(n)=(1-\alpha)\cdot y(n-1)+\alpha\cdot x(n) \quad (1)$$

Like integrator 1015, integrator 1060 can include an IIR filter configured to perform the temporal integration of the weighted pixels of the registered current frame and the previously integrated frame to produce a new integrated frame. If no edge enhancement is applied, integrator 1060 and integrator 1015 can be implemented as a single integrator (also eliminating combiner 1055). Thus, by applying the intermediate integration approach, scene updating filter 1005 can construct an enhanced image of the scene that is a weighted combination of pixels of the registered current frame and pixels of the integrated frame.

Figure 10B:
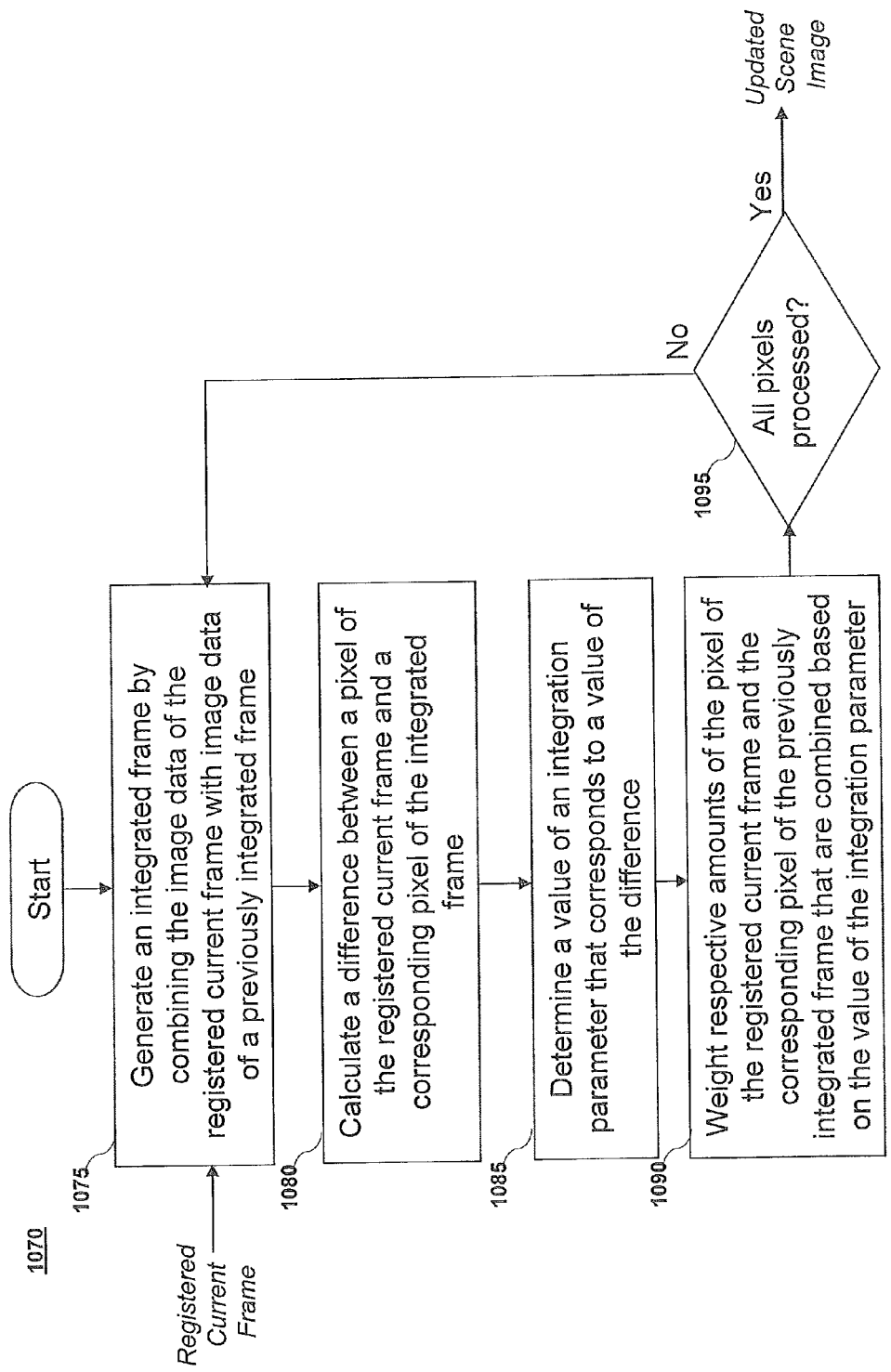

FIG. 10B illustrates a process flowchart illustrating exemplary high-level steps for updating image data of a scene according to an intermediate integration approach. Not all of the steps of FIG. 10B have to occur in the order shown, as will be apparent to persons skilled in the relevant art(s) based on the teachings herein. Other operational and structural embodiments will be apparent to persons skilled in the relevant art(s) based on the following discussion. These steps are described below.

In one implementation, steps 1075-1095 of process 1070 can implement step 230 of process 200, shown in FIG. 2. In step 1075, an integrated frame is generated by combining the image data of the registered current frame with image data of a previously integrated frame. For example, integrator 1015 can be employed to implement step 1075. In step 1080, a difference between a pixel of the registered current frame and a corresponding pixel of the integrated frame is calculated. For example, difference calculator 1010 can be employed to implement step 1080. In step 1085, a value of an integration parameter is determined that corresponds to a value of the difference. For example, lookup table 1035 can be employed to implement step 1085. In step 1090, respective amounts of the pixel of the registered current frame and the corresponding pixel of the previously integrated frame are weighted and combined based on the value of the integration parameter. For example, integrator 1060 can be employed to implement step 1090. In step 1095, it is determined whether all pixels of the registered current frame have been processed. If all pixels have not been processed, then process 1070 returns to step 1075, and steps 1075-1095 are repeated for a next pixel of the registered current frame. If all pixels have been processed, then process 1070 outputs for display an updated image of the scene that is a weighted combination of pixels of the registered current frame and pixels of the integrated frame.

Wide Area Search Mode

In an exemplary embodiment, the techniques for processing images of a scene can be implemented for a wide area search mode application. This mode includes building a large temporally filtered mosaic image of a scene to supply video data to target detection algorithms or to a system operator. By utilizing the scene updating filter 140 (i.e., pixel based temporal filter) and moving a sensor/image capture device about a point, a noise-reduced image map can be built of the wide area scene.

For example, the steps of FIG. 2 can be implemented per a portion of a wide area scene. That is, in step 205, image data of a portion of a scene is received. If, in step 210, the image data is designated as a new reference frame, then, in step 215, N registration points are selected from the image data of the reference frame. If the image data is not a new reference frame, then, in step 210, the image data is a current frame and process 200 proceeds to step 220. In step 220, N motion vectors ($MV_1$ to $MV_N$) are generated using N correlation functions operating on the current and reference frame to describe motion of the image data within the portion of the scene. In step 225, the image data of the current frame is registered based on the N motion vectors ($MV_1$ to $MV_N$) generated in step 220 to produce a registered current frame. In step 230, the image of the portion of the scene is updated based on the registered current frame. After step 230, process 200 returns to step 205 to receive new image data, and steps 210-230 can be repeated each time the new image data corresponds to the portion of the scene. With separate processes operating on separate portions of the wide area scene, a noise-reduced mosaic image can be built of the wide area scene.

Re-Introduction of Smoothed Motion and Re-Initialization

According to an exemplary embodiment, integration of a sequence of registered current image frames can produce an integrated image frame that is registered to a reference frame. In one implementation, an initial frame of image data can be designated as the reference frame. Over time, the context of a scene viewed by a sensor may change significantly (e.g., due to the sensor being mounted on a moving vehicle), therefore, in an exemplary embodiment, the image processing techniques described herein can be periodically reinitialized with a new reference frame to prevent current frames from becoming too dissimilar from the reference frame. In this case, the system 100, shown in FIG. 1, for processing a sequence of images of a scene includes means for determining when to reinitialize the reference frame, which can be implemented with processor device 115. For example, processor device 115 can be configured to monitor the context of the scene and reinitialize the reference frame accordingly. In this way, current frames received after re-initialization can be registered to the new reference frame, which more closely reflects a current context of the scene.

Upon re-initialization of a process, however, the SNRI of the integrated frame will also be re-initialized, such that integrated frames generated immediately following re-initialization will not be noise reduced, but will improve with time until a maximum SNRI is achieved. In addition to the scene appearing noisy immediately following re-initialization, the scene may also appear to "jump" due to the registration of current frames of the new process to a new reference frame. One way to avoid displaying lower-SNR images and a "jump" in the scene upon re-initialization can be to implement a blending technique, in which an integrated frame of a prior process is blended together with integrated frames of a new process for a predetermined period of time following re-initialization.

FIG. 11 illustrates a diagram of an example system/process flow 1100 for reinsertion of smoothed motion and blending of current and previous processes upon re-initialization. System 1100 includes means for receiving image data of a reference frame and a current frame, which can be implemented with image capture device 110 of FIG. 1. System 1100 also includes means for generating N motion vectors using N correlation functions operating on the current frame and the reference frame, which can be implemented with motion tracker 1105, shown in FIG. 11. Motion tracker 1105 includes an image correlator 1110, which can be configured to compute the correlation function at each of the N registration points to generate the N motion vectors that describe motion of the image data within the scene. Motion tracker 1105 also includes an interpolator 1115, which can be configured to interpolate the N motion vectors to determine a set of points (X',Y') for resampling the current frame.

System 1100 further includes means for registering the image data of the current frame based on the N motion vectors, which can be implemented with frame registration function 1120. Frame registration function 1120 can be configured to produce a registered current frame aligned to the reference frame of a first process. For example, frame registration function 1120 can include a bilinear interpolator or the like. System 1100 also includes means for combining the image data of the registered current frame with image data of previously registered frames, which can be implemented with integrator 1125. Integrator 1125 can be configured to produce an integrated frame of the first process aligned to the reference frame of the first process. For example, integrator 1125 can include a pixel-based temporal filter or the like. The output of integrator 1125 is shown in FIG. 11 as a stabilized image of the scene, with an increasing SNR. That is, with each subsequent registered current frame that integrator 1125 combines with the integrated frame of the first process, the SNR of the displayed image of the scene increases.

To handle re-initialization from the first process to a second process, system 1100 includes means for capturing the integrated frame of the first process after a predetermined period of time. Note that the first and second processes can refer to any two sequential processes. In one implementation, the capturing means can be implemented with frame capturer 1130. Frame capturer 1130 can be configured to capture (i.e., store) the high-SNR integrated frame at the end of the first process. Upon re-initialization, the first frame of the second process can be designated as the reference frame for the second process. Note that motion tracker 1105, frame registration function 1120, and integrator 1125 can be configured to produce, during the second integration process, an integrated frame aligned to the reference frame of the second process in the same way the integrated frame aligned to the reference frame of the first process was produced during the first process.

In order to avoid displaying a noisy image of the scene upon re-initialization, system 1110 includes means for registering the image data of the integrated frame of the first process to the reference frame of the second process, which can be implemented with resampler 1135. Resampler 1135 can be configured to register the image data of the integrated frame of the first process based on N motion vectors generated by interpolator 1115, with respect to the reference frame of the second process, and produce an updated integrated frame of the first process that is aligned to the reference frame of the second process. That is, the output of resampler 1135 includes the high-SNR integrated frame captured at the end of the first process, updated to align with the reference frame of the second process.

System 1100 also includes means for blending the integrated frame of the second process with the updated integrated frame of the first process to produce a blended frame, which can be implemented with blender 1140. In one implementation, blender 1140 is configured to blend respective amounts of the updated integrated frame of the first process and the integrated frame of the second process according to a cumulative integration time of the second process. For example, blender 1140 can be configured to execute the blending function of equation (2), in which a blended scene image $I_{blended}$ can be calculated as a weighted sum of an updated integrated frame of the first process $I_{old}$ and an integrated frame of the second process $I_{new}$.

$$I_{blended} = [1-\beta(n)] \cdot I_{old} + \beta(n) \cdot I_{new} \qquad (2)$$

The weighting can be applied according to a blending coefficient, $\beta(n)$, which has a value between zero and one. In one implementation, blender 1140 can be configured to identify $\beta(n)$ from a lookup table of blending coefficients as a function of n, which is a number of frames currently integrated by the second process. Thus, the output of blender 1140 is shown in FIG. 11 as a blended frame, which includes stabilized scene image data of the high-SNR updated integrated frame of the first process and the increasing SNR integrated frame of the second process.

Re-initialization of a process with a new reference frame can result in an abrupt change in the scene image displayed due to the registration of the integrated frame of the first process to the reference frame of the second process. Thus, in an exemplary embodiment, system 1100 further includes means for filtering the N motion vectors to produce N filtered motion vectors, which can be implemented with smoothing filter 1145. Smoothing filter can be configured to filter the N motion vectors to produce filtered, or smoothed, motion vectors. System 1100 also includes means for interpolating the N filtered motion vectors, which can be implemented with interpolator 1150. Interpolator 1150 can be configured to interpolate the N filtered motion vectors to produce a smoothed motion vector for every pixel of the frame to be displayed.

Additionally, system 1100 includes means for resampling the blended frame, which can be implemented with resampler 1160. Resampler 1160 can be configured to resample the blended frame according to the interpolated filtered motion vectors for each pixel of the displayed frame to reintroduce filtered motion of the image data within the scene in a smoothed, controlled fashion. Thus, the output of the resampler 1160 is shown in FIG. 11 as a smoothly moving high-SNR blended image. Alternatively, if system 1100 does not include blending and re-initialization elements (i.e., frame capturer 1130, resampler 1135, and blender 1140), resampler 1160 can be configured to resample the integrated frame, instead of the blended frame, according to the interpolated filtered motion vectors for each pixel of the current frame to reintroduce motion of the image data within the scene in a smoothed, controlled fashion. Like frame registration function 1120, resampler 1160 can include a bilinear interpolator or the like.

Optionally, FIG. 11 shows that system 1100 can include a gray-scale mapper 1170 configured to re-map intensity of the image data of the smoothly moving blended frame according to a mapping to improve perceptual clarity of scene detail to a human operator. Example mappings include histogram-equalization, Rayleigh intensity mapping, or the like. System 1100 can further include means for displaying the blended frame, such as display device 150 of FIG. 1.

Parallel Processes for Moving Target Enhancement

If there is a target in an image of a scene that is moving with respect to a background, the exemplary techniques for processing images of a scene can be used to enhance the SNR of the scene. In the case of a scene including a moving target, if the target contrast is such that SNR improvement is not necessary for good target recognition, then the scene updating filter 140 of FIG. 1 (i.e., a pixel-based IIR filter) will typically identify the target as distinct from the background and allow it to be displayed with little or no integration (which would have smeared the moving target). However, if SNR enhancement of weaker moving targets is desired, a parallel process for processing images of the moving target can be implemented to provide such enhancement, as shown in FIGS. 12A and 12B.

FIGS. 12A and 12B illustrate example system diagrams for parallel scene and moving target image processing techniques implemented with a single merged display and separate displays, respectively. System 1200, shown in FIG. 12A includes means for receiving image data of a scene having a moving target, which can be implemented with image capture device 1205. For example, image capture device 1205 might be configured like image capture device 110 of FIG. 1. In one implementation, system 1200 includes means for operator designation of the moving target within the scene, as shown in FIG. 12A. For example, the operator designation means can be implemented with image capture device controller 155 of FIG. 1 and area tracker 510 of FIG. 5. Alternatively, system 1200 can employ automatic moving target selection techniques.

System 1200 also includes means for processing the image data of the scene by tracking motion of the image data within the scene to produce an updated image of the scene, which can be implemented with scene image processor 1210. Scene image processor 1210 can be configured to track motion of the image data within the scene to produce an updated image of the scene. For example, scene image processor 1210 can be configured with processor device 115, shown in FIG. 1. Processor device 115 can be configured to execute the process steps of FIG. 2.

System 1200 further includes means for processing the image data of the target, which can be implemented with target image processor 1215. Target image processor 1215 can be configured to track motion of the image data of the target within the scene to produce an updated image of the target. For example, target image processor 1215 can be configured to execute a moving target image processing technique, which is described in detail in the following section. Additionally, system 1200 includes means for substituting the updated image data of the target at pixel locations of the moving target in the updated image of the scene, and means for simultaneously displaying the updated image of the scene and the updated image of the target. The substituting means can be implemented with pixel processor 1220 and the display means can be implemented with display device 1225, such that the updated image of the scene and the updated image of the target can be viewed by an operator as a single image. Thus, the target, stabilized and SNR-enhanced, can be displayed by re-insertion into the SNR-enhanced scene at appropriate (moving) coordinates.

Similarly, system 1250, shown in FIG. 12B includes means for receiving image data of a scene having a moving target, which can be implemented with image capture device 1255. For example, image capture device 1225 might be configured like image capture device 110 of FIG. 1. In one implementation, system 1250 includes means for operator designation of the moving target within the scene, as shown in FIG. 12B. For example, the operator designation means can be implemented with image capture device controller 155 of FIG. 1 and area tracker 510 of FIG. 5. Alternatively, system 1250 can employ automatic moving target selection techniques.

System 1250 also includes means for processing the image data of the scene by tracking motion of the image data within the scene to produce an updated image of the scene, which can be implemented with scene image processor 1260. Scene image processor 1260 can be configured to track motion of the image data within the scene to produce an updated image of the scene. For example, scene image processor 1260 can be configured with processor device 115 shown in FIG. 1. Processor device 115 can be configured to execute the process steps of FIG. 2.

System 1250 further includes means for processing the image data of the target, which can be implemented with target image processor 1270. Target image processor 1270 can be configured to track motion of the image data of the target within the scene to produce an updated image of the target. For example, target image processor 1270 can be configured to execute a moving target image processing technique, which is described in detail in the following section.

Like system 1200, system 1250 includes means for simultaneously displaying the updated image of the scene and the updated image of the target. In system 1250, however, the displaying means can be implemented with a scene image display device 1265, configured to display the updated image of the scene, and a target image display device 1275, configured to display the updated image of the target. Display devices 1265 and 1275 can be configured such that the updated image of the scene and the updated image of the target appear in separate displays. Alternatively, display devices 1265 and 1275 can be configured as picture-in-picture displays, in which the updated target image is displayed in a window within a window in which the updated image of the scene is displayed. The parallel moving target processing technique is described in detail in the following section.

Moving Target Image Processing Technique

Figure 3:
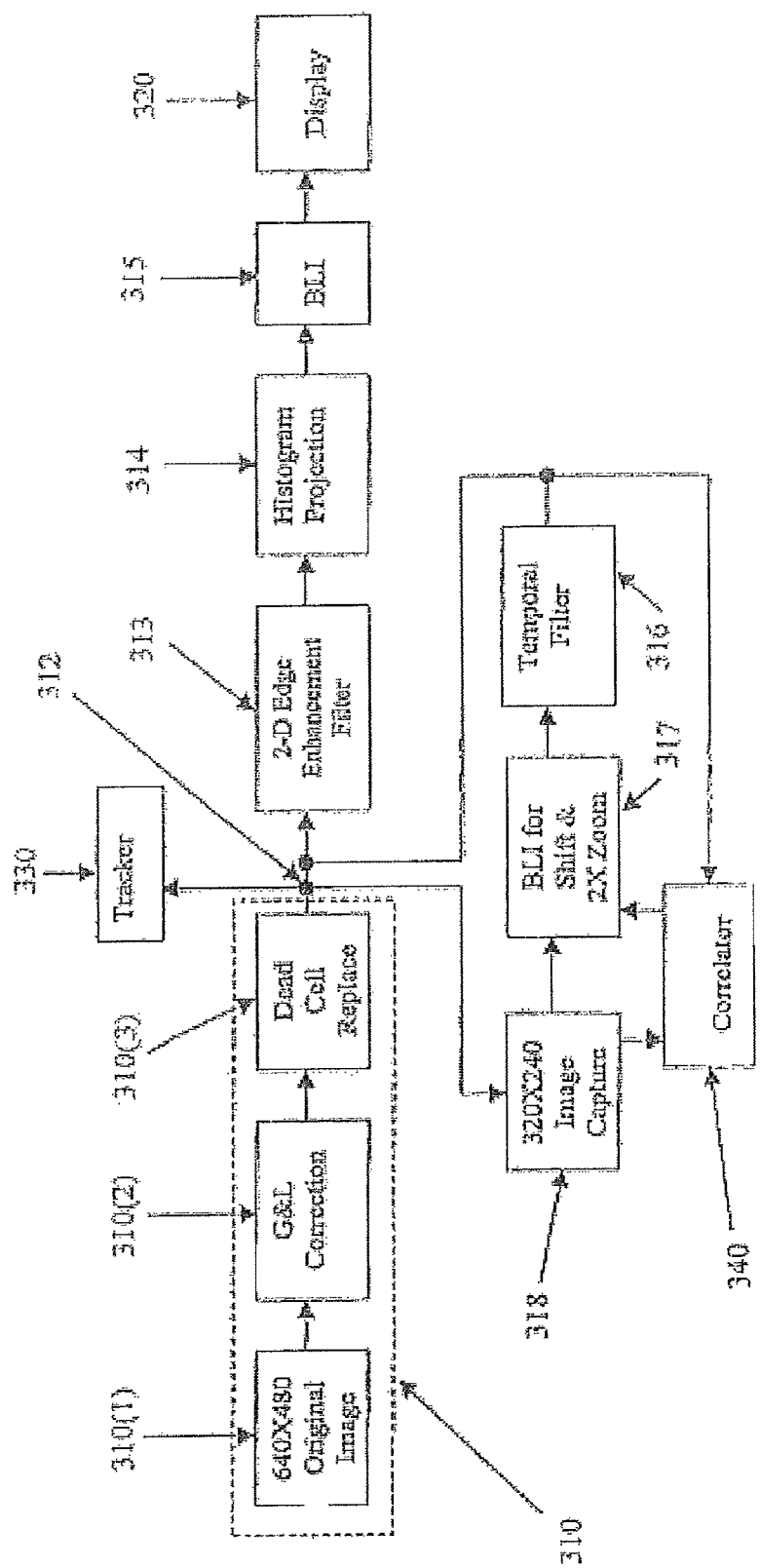
FIG. 3 illustrates a high-level diagram of a system for moving target image processing.

U.S. patent application Ser. No. 09/841,079, filed Apr. 25, 2001, now U.S. Pat. No. 7,103,235, which is incorporated by reference herein in its entirety, describes an exemplary technique for moving target image processing. FIG. 3 is a functional block diagram of a system for processing imagery, such as digital imagery, using an Electro-Optical (EO) system. Image acquisition can be initiated by an operator or, for example, during target track. Initially, a first frame of data can be selected as a template frame, in any desired fashion. For example, the template frame can be selected from a database of possible templates, or can be captured using the EO system, or any other image source.

In the FIG. 3 embodiment, an image storage device 310 can store an image, referred to herein as an original image 310(1), in any known manner. The original image 310(1) can be a pre-stored frame of image data or image data acquired in any manner known in the art, from any of a variety of EO systems or sensors including, but not limited to, a thermal sensor, imaging radar sensor, infrared sensor or the like, or from, for example, the Field Programmable Gate Array (FPGA) device described in U.S. patent application Ser. No. 09/841,081, now U.S. Pat. No. 6,973,218, the disclosure of which is hereby incorporated by reference in its entirety. The original image 310(1) can be optionally processed with gain and level correction block 310(2) and dead cell replacement block 310(3) to improve the quality of the image. The output of image storage device 310 is an original frame 312. The original frame 312 can be processed in the FIG. 3 example to become the template frame.

More particularly, an image capture device 318 can pass original frame 312 from image storage device 310 through temporal filter 316 or a frame integrator, whereupon the processed image data can become the first frame (e.g., a template frame) for applying an image correlation function at correlator 340 against subsequently-captured frames of data from image capture device 318. However, any technique can be used for generating the template frame. For example, several frames of data (e.g., several original frames 312) could be temporally filtered and then decimated to the original, single frame sample lattice to form the template frame. Alternatively, for example, original frame 312 can become the template frame without any processing (e.g., no temporal filtering).

In addition to receiving original frame 312 from image storage device 310, at least one frame of data of a subsequent image is captured by image capture device 318 (e.g., a camera of an EO system) as a second frame of data, which can be offset from the image frame associated with original frame 312. Image storage device 310 can, of course, also be used to supply the additional frames to image capture device 318. In an exemplary embodiment, a center portion of the second frame, corresponding to a portion (e.g., one-half) of the field-of-view (FOV) of the second frame, is used in subsequent calculations. The second frame can also be optionally processed with gain and level correction and dead cell replacement to improve the quality of the second frame.

A correlator 340 is provided for correlating the second frame with the template frame to generate a shift vector. The shift vector quantifies any shift between the second frame and the template frame. For example, correlator 340 is a Mean Absolute Difference (MAD) correlator or any other suitable image correlator. Image correlation stabilizes the second frame and assists in the correction of any line of sight (LOS) deviations between the template frame and the second frame. Thus, correlator 340 insures that the template frame and the second frame are aligned to within a fraction of a pixel, for example, at least one tenth of a pixel.

Bilinear interpolator (BLI) 317 can be used to spatially register the second frame with the template frame. Bilinear interpolation is well-known in the art and is described, for example, in U.S. Pat. No. 5,801,678, the disclosure of which is hereby incorporated by reference. BLI 317 interpolates the second frame to shift the second frame relative to the template frame using the shift vector generated by correlator 340 to align the second frame with the template frame. In addition, BLI 317 re-samples (e.g., over-samples) at least a portion of the second frame by a factor of greater than one, or by any desired amount, to generate an output sample lattice. As a result of re-sampling by a factor of two, for example, the output sample lattice will contain at least double the number of samples of the second frame for the portion of the second frame which has been re-sampled. Thus, in an exemplary embodiment, BLI 317 registers a second frame with the template frame by interpolating the second frame using the shift vector, and re-sampling (e.g., over-sampling) at least a portion of the second frame. The second frame can be shifted so that the center of the FOV of the second frame is aligned with the center of the FOV of the template frame.

Bilinear interpolation can be used to re-sample and shift the second frame. Those of ordinary skill in the art will appreciate that other forms of interpolation that perform image re-sampling and shifting can also be used, such as cubic interpolation, spline interpolation, or fractal interpolation. As a result of interpolation, image shift due to line-of-sight (LOS) stabilization errors or a small commanded LOS drift can provide over-sampling of a target image in addition to fixed pattern noise averaging over several pixels.

Alternatively, instead of correlating the template frame with at least a portion of the second frame to generate a shift vector and using the shift vector to shift the second frame, an inertial motion measurement unit (IMU) can be used. An IMU can be used in low SNR conditions where correlation would not be effective. An IMU generates angular measurements. In other words, an IMU measures how much the LOS has changed from one frame to the next. The angular measurement generated by the IMU can be used to shift the second frame. Thus, BLI 317 can interpolate the second frame to shift the second frame relative to the template frame using the angular measurement generated by the IMU to align the second frame with the template frame.

The template frame can also be re-sampled using, for example, bilinear interpolation. As discussed previously, the re-sampled template frame can be derived from the template frame alone, or from any combination of earlier processed frames.

Temporal filter 316 or a frame integrator can be used to combine the re-sampled template frame and the registered frame to generate an averaged frame. Temporal filter 316 can combine the registered frame and the template frame by averaging the two frames together. However, any suitable filtering or integration technique that performs image combination can be used.

Temporal filter 316 or a frame integrator can average each pixel of the template frame with many registered frames to achieve greater than an order of magnitude signal-to-noise ratio (SNR) enhancement within, for example, a few hundred milliseconds. Resulting improvements to the SNR provide extended range image processing systems the capability to significantly enhance the high frequency image data of the averaged frame using a two-dimensional (2-D) edge enhancement filter 313. The averaged frame is also input to correlator 340 as an updated template frame for applying an image correlation function at correlator 340 against subsequently-captured frames of data from image capture device 318. A subsequently-captured frame of data is then registered with the updated template frame using BLI 317.

2-D edge enhancement filter 313 can be used to provide enhancement to the edges contained within the averaged frame. According to an exemplary embodiment, edge enhancement is accomplished by performing a low pass filtering operation on the averaged frame, thereby generating a low pass image. By subtracting the low pass image from the averaged frame, a high pass image is generated. Then, the relative gain of the low and high pass images are adjusted before integrating the two images to form an enhanced image. Two-dimensional edge enhancement is known in the art and is described, for example, in commonly-assigned U.S. patent application Ser. No. 09/463,410, now U.S. Pat. No. 6,359,681, the disclosure of which is hereby incorporated by reference.

Edge enhancement provided by 2-D edge enhancement filter 313 can be suppressed in low contrast conditions to ensure that the image quality is not excessively noisy. Consequently, temporal filter 316 can allow enhancement of high frequency target information, even in lower contrast conditions when 2-D edge enhancement filtering is undesirable. Accordingly, target acquisition is provided closer to the fundamental diffraction limit defined by, for example, the optics associated with sensors and the waveband of operation. The resulting image provided to display 320 can, therefore, be a highly stabilized image with exceptional SNR and resolution performance.

To overcome any eye-to-display limitations, the pixel depth of the image resulting from 2-D edge enhancement filter 313 can be optionally changed with the use of histogram projection 314 before being provided to display 320. Changing the pixel depth of an image using histogram projection is known in the art, and is described, for example, in the above-referenced U.S. patent application Ser. No. 09/463,410, now U.S. Pat. No. 6,359,681. In addition or alternatively to changing the pixel depth of the image, the image resulting from 2-D edge enhancement filter 313 can be optionally interpolated in BLI 315 using, for example, bilinear interpolation to re-sample the image to either reduce or enlarge the size of the image before being provided to display 320.

Motion can be added to the LOS of the EO system according to either a commanded LOS pattern or a random pattern to generate multiple frames of data. The multiple frames are generated by commanding a gimbal to move in either a commanded LOS pattern or a random pattern. This is in contrast to FSM, which moves the gimbal in a very precise manner and which allows for known shifts to align the images. The present invention, however, uses image correlation in correlator 340 to calculate the shift between two or more frames. Therefore, the specific LOS motion need not be known. Rather, the motion simply must be sufficient to ensure that the target image is sampled with different pixels. For example, the movement of the gimbal can be done in a circular or other two-dimensional pattern in order to guarantee that the target image is moved about a sufficient number of different pixels. However, any random motion of the gimbal will suffice. Such motion will allow for the fixed pattern noise to be integrated out.

Once the gimbal has been commanded to move, each of the multiple frames can be analyzed with an image correlation function in correlator 340 and shifted back to the center of the FOV using BLI 317. The shifting will place each of the multiple frames back to the same place as the target image was in the previous frame (i.e., spatially register each of the multiple frames with the template frame). Once this step is complete, each of the registered frames can be passed to temporal filter 316 or frame integrator where each of the registered frames can be averaged with past frames. Temporal averaging will allow for noise integration, which will result in noise reduction. The resulting noise reduction will be observed in both the temporal and spatial domains.

Gain and level correction block 310(2) can be optionally applied to original image 310(1). Gain and level correction can also be optionally applied to the subsequently-captured frames from image capture device 318. Gain and level correction block 310(2) can be used to, for example, remove noise components from original image 310(1) by calibrating each pixel. The noise components to be removed by calibrating each pixel are, for example, caused by variations in the gain and level from one detector element to the next. These gain and level variations are passed to the corresponding pixel values during acquisition of original image 310(1). Calibration is accomplished, in a FLIR for example, by applying a hot reference and a cold reference to each detector element and by adjusting the gain coefficient and the level coefficient for each pixel, if necessary, such that each pixel reflects the same value in response to the hot reference and in response to the cold reference. The process of calibrating each pixel value in response to a hot reference and a cold reference is known in the art, and is described, for example, in the above-incorporated U.S. patent application Ser. No. 09/463,410, now U.S. Pat. No. 6,359,681.

Dead cell replacement is optionally performed at dead cell replacement block 310(2) on original image 310(1). Dead cell replacement can also be optionally applied to the subsequently-captured frames from image capture device 318. This feature can be used to maintain a list of "dead" cells (i.e., detector elements that do not properly respond), and to replace the pixel value corresponding to each "dead" cell with a best approximation value. The best approximation value is derived, for example, by averaging the values of the pixels which border the pixel corresponding to a "dead" cell. Only neighboring pixels that correspond to properly functioning detector elements are used for deriving a best approximation value.

Dead cell replacement block 310(2) can determine which detector elements are "dead" by applying any number of well known criteria. For example, the thermal response of each detector element can be compared to an expected response. If the actual response is far greater or far less than expected, the corresponding detector element is probably not functioning properly. Another criterion that is often used to establish whether a detector element is not properly functioning is whether the digital response of the detector element is steady or whether it appears to flicker. A flickering or jittery response probably indicates that the corresponding detector element is not properly functioning. Yet another criterion is to compare the actual response of a given detector element to the mean value taken from the response of all of the detector elements. A response that is substantially different from the mean response probably indicates that the corresponding detector element is not functioning properly. Also, if the dynamic range of a given detector element is limited, this probably indicates that the detector element is not functioning properly. One skilled in the art will understand that this list of criteria is not exclusive, and that other criteria can similarly be used to identify "dead" detector elements. The procedure for replacing "dead" cells is known in the art, and is described, for example, in the above-incorporated U.S. patent application Ser. No. 09/463,410, now U.S. Pat. No. 6,359,681.

One skilled in the art will understand that other techniques can be used, such as the technique described in U.S. Pat. No. 6,901,173, the disclosure of which is hereby incorporated by reference in its entirety.

Figure 4:
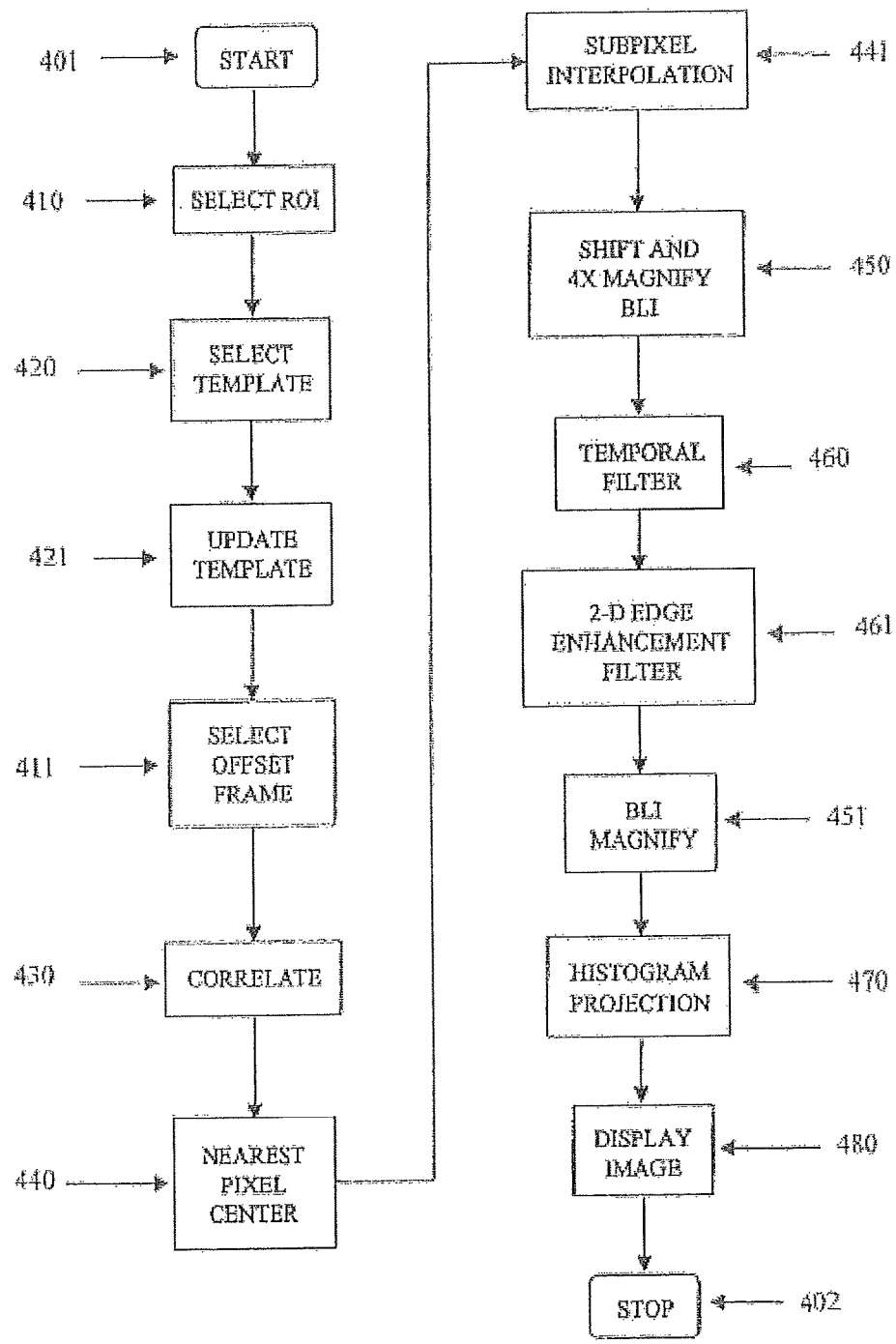
FIG. 4 is a process flowchart illustrating exemplary steps for moving target image processing.

FIG. 4 illustrates a process flowchart with exemplary steps for extended range image processing. An exemplary extended range image processing scenario is illustrated beginning from step 401. Accordingly, at step 410, a region of interest (ROI) is selected around a target in the image data provided from a typical sensor or other EO system. The ROI can be, for example, 160×320 pixels such that when re-sampling occurs, the resulting image will be on the order of, for example, 640×480 pixels, which is the size of the input image and represents an over-sampling of four times.

A template frame can be selected and stored in step 420. For example, the original frame 312 acquired by the EO system can be temporally filtered to generate the template frame. The template can be used to initiate the functionality as is described herein and is, for example, 32×32 pixels in size to provide sub-Patent pixel target centroids. The template can further be stored, for example, in full 16 bit palette representation. The template can be updated in step 421, whenever it is desirable to do so.

Updating the template can be performed from the down-sampled output of a temporal averaging filter such as that used, for example, in step 460. Updating can occur, for example, every four frames, since continuous updating can result in a filtered template that can be blurred and shifted.

A second frame of data can then be selected in step 411 from the center of the ROI. The second frame can be, for example, the same size as the template plus a border to ensure full enclosure of the target. The size of the border region can be selected based on the amount of "walking" that will occur from one frame to the next such that the centroid can be accurately determined.

In step 430, image correlation is performed on the template frame and the second frame. The image correlator is preferably a Mean Absolute Difference (MAD) correlator that subtracts the template frame from the second frame in a point-wise fashion. The magnitude of the result is then averaged for each valid point of the target that is totally enclosed in the respective frames. The results of correlation in step 430 will be, for example, a correlator output matrix with a size equal to the size difference between the first and template frames plus one.

The correlator output matrix can then be analyzed in step 440 to determine the center of the target in the second frame. The correlator output matrix includes a set of numbers indicating how similar the template frame and the second frame are at each point. The pixel value in the correlator output matrix having the smallest number associated with it represents the center point of the second frame that is most similar to the template frame. To better find the true center pixel, the most-likely center pixel can first be determined by using measures of the correlation value and the distance from the anticipated center.

Once the center pixel is determined using, for example, the process described in relation to step 440, sub-pixel interpolation can be performed in step 441. Sub-pixel interpolation involves, for example, analyzing a 5×5 pixel region around the center pixel to determine the true centroid with a high degree of accuracy. Accordingly, a fourth-order polynomial can be generated to fit the x and y means and a minimum value determined for the polynomial fit. The minimum value of the polynomial fit represents the true centroid in the second frame to within, for example, one twentieth of a pixel. A shift vector can be generated from the minimum fit value, which can be used in the BLI of step 450 to shift the second frame.

As described, the shift vector can be used in block 450 to shift the second frame to align it with the template frame. The second frame is then re-sampled (e.g., over-sampled) by, for example, a factor of four. The resulting shifted and re-sampled second frame will be spatially registered with the template frame. The shifting and magnification are performed, for example, by means of bilinear interpolation. However, those of ordinary skill in the art will appreciate that other forms of interpolation that are capable of shifting and re-sampling an image can be used, such as cubic interpolation, spline interpolation, or fractal interpolation. The output of the BLI in step 450 (i.e., the registered frame) will have invalid regions that can be set to zero.

After interpolation in step 450, the registered frame and a likewise re-sampled template frame can be filtered with a temporal-averaging filter in step 460 to generate an averaged frame. It should be noted that a temporal recursive frame filter can be used, but only if correlation metrics indicate that a suitable centroid was determined in, for example, steps 440 and 441. By using, for example, a temporal recursive frame filter with tapered coefficients equal to 1-(1/number of recursive iterations), a faster response can be achieved from the filter with greater noise reduction. Zeros at the edges of the FOV should not be updated.

At step 461, high spatial frequency components of the averaged frame can be enhanced using a multi-stage 2-D edge enhancement filter. For example, the averaged frame can be blurred with an n × n box filter, multiplied by a constant less than one and subtracted from the original averaged frame. Multiple stages are applied in series, for example, so that different weights can be used for different spatial frequency levels. Expected frequency levels are, for example, 7×7, 5×5, and 3×3. Larger kernel sizes are used, because of the magnification factors.

Down-sampling can be performed by BLI magnification in step 451 when the image resulting from the 2-D edge enhancement filter of step 461 needs to be set to the appropriate size for display. The image can be down-sampled by simply windowing down on an ROI around the target, or by applying BLI magnification of less than the current image magnification. The image can be further manipulated by, for example, down-converting the image from 16-bit palette to an 8-bit palette using histogram projection in step 470. The down-sampled and/or down-converted image can be displayed to the operator in step 480. Finally, at step 402, the scenario can be stopped or continued in a cyclical fashion to process subsequently-captured frames of data.

The exemplary process steps of FIGS. 3 and 4 can be implemented using a sensor (not shown) for generating input data. The sensor can be, for example, a CCD camera, FLIR, a vidicon camera, a Low Light Level camera, a laser illuminated camera, or any other EO sensor capable of collecting image data. A person skilled in the art will realize that the operations of the exemplary process steps of FIGS. 3 and 4 can be controlled by a processor module (not shown), coupled to the sensor, that uses a suitable software program. For example, the processor module can be configured to select a first frame of data as a template frame, capture a second frame of data using the EO system, correlate at least a portion of the second frame with the template frame to generate a shift vector, register the second frame with the template frame by interpolating the second frame using the shift vector and re-sampling at least a portion of the second frame to produce a registered frame, re-sample the template frame, and combine the re-sampled template frame and the registered frame to generate an averaged frame. The processor module can be implemented with a general purpose microprocessor (e.g., a general purpose microprocessor from Intel®, Motorola, or AMD). Alternatively, the processor module can be implemented using a FPGA, such as, for example, a Virtex™ Series FPGA from Xilinx® that can have from, for example, one million to three million gates per FPGA.

The present invention has been described with reference to several exemplary embodiments, however, it will be readily apparent to persons of skill in the relevant art(s) that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for processing images of a scene, comprising:
   receiving image data of a reference frame and a current frame;
   selecting N registration points in the reference frame by identifying a plurality of candidate registration points in the reference frame based on at least one of an intensity value and an edge metric value, and selecting N registration points from among the identified candidate registration points based on a shape of an autocorrelation function;
   generating N motion vectors that describe motion of the image data within the scene by computing a correlation function on the reference and current frames at each of the selected N registration points;
   registering the image data of the current frame based on the N motion vectors to produce a registered current frame; and
   updating the image data of the scene based on the registered current frame;
   filtering the N motion vectors to produce N filtered motion vectors;
   interpolating the N filtered motion vectors to produce filtered motion vectors for each pixel of the current frame; and
   resampling a frame to be displayed according to the filtered motion vectors for each pixel of the current frame to reintroduce filtered motion of the image data within the scene.

2. The method of claim 1, wherein the selecting of the N registration points comprises:
   selecting N registration points by dividing the reference frame into N tiles, dividing each of the N tiles into a plurality of sub-tiles, identifying a candidate registration point for each of the sub-tiles, and selecting one of the identified candidate registration points for each of the N tiles.

3. A method for processing images of a scene, comprising:
   receiving image data of a reference frame and a current frame;
   selecting N registration points in the reference frame by identifying a plurality of candidate registration points in the reference frame based on at least one of an intensity value and an edge metric value, and selecting N registration points from among the identified candidate registration points based on a shape of an autocorrelation function;
   generating N motion vectors that describe motion of the image data within the scene by computing a correlation function on the reference and the current frame at each of the selected N registration points;
   registering the image data of the current frame to the reference frame based on the N motion vectors to produce a registered current frame;
   generating an integrated frame by combining the image data of the registered current frame with image data of a previously integrated frame;
   repeating, for a predetermined period of time, the generating N motion vectors, the registering, and the generating an integrated frame for each subsequent current frame received; and
   capturing an integrated frame of a first process and designating a reference frame for a second process.

4. The method of claim 3, comprising:
   registering the image data of the integrated frame for the first process to the reference frame for the second process to produce an updated integrated frame for the first process; and
   blending the updated integrated frame for the first process with an integrated frame for the second process to produce a blended frame.

5. The method of claim 4, wherein the blending comprises:
   weighting an amount of the updated integrated frame for the first process and an amount of the integrated frame for the second process combined to produce the blended frame.

6. The method of claim 4, further comprising:
   producing an image which includes the blended frame.

7. The method of claim 3, wherein the selecting of the N registration points comprises:
   selecting N registration points by dividing the reference frame into N tiles, dividing each of the N tiles into a plurality of sub-tiles, identifying a candidate registration point for each of the sub-tiles, and selecting one of the identified candidate registration points for each of the N tiles.

8. A system for processing images of a scene, comprising:
   means for receiving image data of a reference frame and a current frame;
   means for selecting N registration points in the reference frame by identifying a plurality of candidate registration points in the reference frame based on at least one of an intensity value and an edge metric value, and selecting N registration points from among the identified candidate registration points based on a shape of an autocorrelation function;
   means for generating N motion vectors that describe motion of the image data within the scene, wherein the motion vector generation means is configured to compute a correlation function on the reference and current frames at each of the selected N registration points;
   means for registering the image data of the current frame based on the N motion vectors to produce a registered current frame;
   means for updating the image data of the scene based on the registered current frame;
   means for filtering the N motion vectors to produce N filtered motion vectors;

means for interpolating the N filtered motion vectors to produce filtered motion vectors for each pixel of the current frame; and means for resampling a frame to be displayed according to the filtered motion vectors for each pixel of the current frame to reintroduce filtered motion of the image data within the scene, wherein at least one of the means comprises a processor of a computer processing device.

9. The system of claim 8, wherein the means for selecting the N registration points select the N registration points by dividing the reference frame into N tiles, dividing each of the N tiles into a plurality of sub-tiles, identifying a candidate registration point for each of the sub-tiles, and selecting one of the identified candidate registration points for each of the N tiles.

10. A system for processing images of a scene, comprising:
means for receiving image data of a reference frame and a current frame;
means for selecting N registration points in the reference frame by identifying a plurality of candidate registration points in the reference frame based on at least one of an intensity value and an edge metric value, and selecting N registration points from among the identified candidate registration points based on a shape of an autocorrelation function;
means for generating N motion vectors that describe motion of the image data within the scene by computing a correlation function on the reference and current frames at each of N registration points;
means for registering the image data of the current frame to the reference frame based on the N motion vectors to produce a registered current frame;
means for generating an integrated frame by combining the image data of the registered current frame with image data of a previously integrated frame; and
means for capturing, after a predetermined period of time, an integrated frame of a first process,
wherein at least one of the means comprises a processor of a computer processing device.

11. The system of claim 10, comprising:
means for registering the image data of the integrated frame for the first process to a reference frame for a second process to produce an updated integrated frame for the first process; and
means for blending the updated integrated frame for the first process with an integrated frame for the second process to produce a blended frame.

12. The system of claim 11, wherein the blending means is configured to weight an amount of the updated integrated frame for the first process and an amount of the integrated frame for the second process combined to produce the blended frame.

13. The system of claim 10, wherein the means for selecting the N registration points select the N registration points by dividing the reference frame into N tiles, dividing each of the N tiles into a plurality of sub-tiles, identifying a candidate registration point for each of the sub-tiles, and selecting one of the identified candidate registration points for each of the N tiles.

14. A system for processing images of a scene, comprising:
an image capture device configured to receive image data; and
a processor configured to process received image data of a reference frame and a current frame, the processor comprising a registration point selector configured to select N registration points in the reference frame by identifying a plurality of candidate registration points in the reference frame based on at least one of an intensity value and an edge metric value, and selecting N registration points from among the identified candidate registration points based on a shape of an autocorrelation function;
a motion tracker configured to generate N motion vectors that describe motion of the image data within the scene by computing a correlation function on the reference and current frames at each of the N registration points selected by the registration point selector,
a frame registration function configured to register the image data of the current frame based on the N motion vectors to produce a registered current frame, and
a scene updating filter configured to update the image data of the scene based on the registered current frame;
a smoothing filter configured to filter the N motion vectors, wherein the smoothing filter produces N filtered motion vectors;
an interpolator configured to interpolate the N filtered motion vectors to produce filtered motion vectors for each pixel of the current frame; and
a resampler configured to resample a frame to be displayed according to the filtered motion vectors for each pixel of the current frame to reintroduce filtered motion of the image data within the scene.

15. The system of claim 14, wherein the registration point selector is configured to select the N registration points by dividing the reference frame into N tiles, dividing each of the N tiles into a plurality of sub-tiles, identifying a candidate registration point for each of the sub-tiles, and selecting one of the identified candidate registration points for each of the N tiles.

16. A system for processing images of a scene, comprising:
an image capture device configured to receive image data; and
a processor configured to process the image data of a reference frame and a current frame, comprising:
a registration point selector configured to select N registration points in the reference frame by identifying a plurality of candidate registration points in the reference frame based on at least one of an intensity value and an edge metric value, and selecting N registration points from among the identified candidate registration points based on a shape of an autocorrelation function;
a motion tracker configured to generate N motion vectors that describe motion of the image data within the scene by computing a correlation function on the reference and current frames at each of the N registration points selected by the registration point selector,
a frame registration function configured to register the image data of the current frame to the reference frame based on the N motion vectors to produce a registered current frame,
a scene updating filter configured to generate an integrated frame by combining the image data of the registered current frame with image data of a previously integrated frame, and
a frame capturer configured to capture, after a predetermined period of time, an integrated frame of a first process.

17. The system of claim 16, comprising:
a resampler configured to register the image data of the integrated frame for the first process to a reference frame for a second process to produce an updated integrated frame for the first process; and
a blender configured to blend the updated integrated frame for the first process with an integrated frame for the second process to produce a blended frame.

18. The system of claim 17, wherein the blender is configured to weight an amount of the updated integrated frame for the first process and an amount of the integrated frame for the second process combined to produce the blended frame.

19. The system of claim 16, wherein the registration point selector is configured to select the N registration points by dividing the reference frame into N tiles, dividing each of the N tiles into a plurality of sub-tiles, identifying a candidate registration point for each of the sub-tiles, and selecting one of the identified candidate registration points for each of the N tiles.

* * * * *